US010167421B2

(12) United States Patent
Weerasooriya et al.

(10) Patent No.: US 10,167,421 B2
(45) Date of Patent: *Jan. 1, 2019

(54) PHENOL-ALKOXYLATE CO-SOLVENT SURFACTANT COMPOSITION

(71) Applicant: Board of Regents, The University of Texas System, Austin, TX (US)

(72) Inventors: Upali P. Weerasooriya, Austin, TX (US); Gary A. Pope, Cedar Park, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,754

(22) Filed: Feb. 28, 2017

(65) Prior Publication Data

US 2017/0166802 A1 Jun. 15, 2017

Related U.S. Application Data

(63) Continuation of application No. 14/194,288, filed on Feb. 28, 2014.

(60) Provisional application No. 61/770,949, filed on Feb. 28, 2013.

(51) Int. Cl.
*C09K 8/584* (2006.01)
*C09K 8/588* (2006.01)
*E21B 43/16* (2006.01)

(52) U.S. Cl.
CPC .............. *C09K 8/584* (2013.01); *C09K 8/588* (2013.01); *E21B 43/16* (2013.01)

(58) Field of Classification Search
CPC ............... C09K 8/584; C09K 2208/08; C09K 2208/24; C09K 3/18; C09K 3/185; C09K 5/04; C09K 5/10; C09K 8/035; C09K 8/34; C09K 8/52; C09K 8/58; C09K 8/582; C09K 8/685; C09K 8/66; C09K 8/80; C09K 2205/106; C09K 2205/40; C09K 3/30; C09K 5/045; C09K 8/06; C09K 8/512; C09K 8/565; C09K 8/5753; C09K 8/592; C09K 8/594; C09K 8/68; E21B 19/002; E21B 19/10; E21B 19/16; E21B 19/165; E21B 19/22; E21B 19/24; E21B 2033/005; E21B 21/08; E21B 21/10; E21B 23/004; E21B 23/01; E21B 23/04; E21B 23/06; E21B 28/00; E21B 29/00
See application file for complete search history.

(56) References Cited

U.S. PATENT DOCUMENTS

| 3,811,504 | A | * | 5/1974 | Flournoy | C09K 8/584 166/270.1 |
| 4,101,425 | A | * | 7/1978 | Young | C09K 8/74 166/307 |
| 4,293,428 | A | | 10/1981 | Gale et al. | |
| 4,518,038 | A | * | 5/1985 | Maddox, Jr. | C09K 8/584 166/266 |
| 4,552,673 | A | * | 11/1985 | Grolitzer | C09K 8/035 166/275 |
| 4,614,236 | A | * | 9/1986 | Watkins | C09K 8/26 134/36 |
| 4,618,450 | A | * | 10/1986 | Higgins | B01F 17/0057 252/75 |
| 4,722,396 | A | | 2/1988 | Balzer et al. | |
| 4,775,489 | A | * | 10/1988 | Watkins | C09K 8/26 134/22.14 |
| 4,821,803 | A | * | 4/1989 | Debons | C09K 8/58 166/270.1 |
| 5,114,599 | A | | 5/1992 | Debons et al. | |
| 5,279,760 | A | * | 1/1994 | Sato | C11D 3/2068 510/109 |
| 6,148,913 | A | | 11/2000 | Collins | |
| 6,225,267 | B1 | | 5/2001 | Eckard et al. | |
| 7,629,299 | B2 | | 12/2009 | Berger et al. | |
| 2006/0001011 | A1 | * | 1/2006 | Wilson | B05D 1/045 252/500 |
| 2008/0010772 | A1 | | 1/2008 | Kong et al. | |
| 2008/0045439 | A1 | * | 2/2008 | Held | C11D 1/72 510/488 |
| 2008/0196893 | A1 | | 8/2008 | Berger et al. | |
| 2009/0264329 | A1 | | 10/2009 | Underwood et al. | |
| 2010/0069272 | A1 | * | 3/2010 | Morvan | C09K 8/584 507/238 |
| 2010/0292110 | A1 | | 11/2010 | Pope et al. | |
| 2011/0059873 | A1 | | 3/2011 | Weerasooriya et al. | |

(Continued)

FOREIGN PATENT DOCUMENTS

EP 0459171 A1 12/1991
WO 2007141067 A1 12/2007

(Continued)

OTHER PUBLICATIONS https://en.wikipedia.org/wiki/ Ethoxylation, downloaded on Nov. 12, 2016.*
https://en.wikipedia.org/wiki/Hard_water, downloaded on Nov. 12, 2016.*
International Search Report and Written Opinion issued in Application No. PCT/US2012/069563, dated Mar. 28, 2013.

(Continued)

*Primary Examiner* — Kumar R Bhushan

(74) *Attorney, Agent, or Firm* — Meunier Carlin & Curfman LLC

(57) ABSTRACT

Provided herein are, inter alia, compositions including a surfactant and a phenol-alkoxylate co-solvent useful in enhanced oil recovery. The compositions and methods provided herein are particularly useful for oil recovery under a broad range of reservoir conditions (e.g. high to low temperatures, high to low salinity, highly viscous oils).

21 Claims, 4 Drawing Sheets

(56) References Cited

U.S. PATENT DOCUMENTS

| | | | |
|---|---|---|---|
| 2011/0190174 A1 | 8/2011 | Weerasooriya et al. | |
| 2011/0278004 A1* | 11/2011 | Ali | C09K 8/524 |
| | | | 166/285 |
| 2011/0290482 A1 | 11/2011 | Weerasooriya et al. | |
| 2012/0040880 A1* | 2/2012 | Rieth | A61K 8/39 |
| | | | 510/138 |
| 2013/0081808 A1* | 4/2013 | Zeidani | C09K 8/592 |
| | | | 166/272.4 |

FOREIGN PATENT DOCUMENTS

| | | |
|---|---|---|
| WO | 2008079855 A3 | 1/2009 |
| WO | 2011037954 A2 | 3/2011 |
| WO | 2011094442 A1 | 8/2011 |
| WO | 2012027757 A1 | 3/2012 |
| WO | 2012145274 A2 | 10/2012 |
| WO | 2012154376 A2 | 11/2012 |

OTHER PUBLICATIONS

International Search Report and Written Opinion issued in Application No. PCT/US2014/019592, dated May 26, 2014.
https://en.wikipedia.org/wiki/Ethoxylation, downloaded on Sep. 21, 2017.
https://en.wikipedia.org/wiki/Hard_water, downloaded on Sep. 21, 2017.

* cited by examiner

PHENOL-ALKOXYLATE CO-SOLVENT SURFACTANT COMPOSITION

CROSS-REFERENCE TO RELATED APPLICATIONS

This application claims the benefit of U.S. Provisional Application No. 61/770,949 filed Feb. 28, 2013, which is hereby incorporated in its entirety and for all purposes.

BACKGROUND OF THE INVENTION

Enhanced Oil Recovery (abbreviated EOR) refers to techniques for increasing the amount of unrefined petroleum, or crude oil that may be extracted from an oil reservoir (e.g. an oil field). Using EOR, 40-60% of the reservoir's original oil can typically be extracted compared with only 20-40% using primary and secondary oil recovery methods (e.g. by water injection or natural gas injection). Enhanced oil recovery may also be referred to as improved oil recovery or tertiary oil recovery (as opposed to primary and secondary oil recovery).

Enhanced oil recovery may be achieved by a variety of methods including miscible gas injection (which includes carbon dioxide flooding), chemical injection (which includes polymer flooding, alkaline flooding and surfactant flooding), microbial injection, or thermal recovery (which includes cyclic steam, steam flooding, and fire flooding). The injection of various chemicals, usually as dilute aqueous solutions, has been used to improve oil recovery. Injection of alkaline or caustic solutions into reservoirs with oil that has organic acids or acid precursors naturally occurring in the oil will result in the production of soap (i.e. in situ generated soap) that may lower the interfacial tension enough to increase production. Injection of a dilute solution of a water soluble polymer to increase the viscosity of the injected water can increase the amount of oil recovered in some formations. Dilute solutions of surfactants such as petroleum sulfonates may be injected to lower the interfacial tension or capillary pressure that impedes oil droplets from moving through a reservoir. Special formulations of oil, water and surfactant microemulsions, have also proven useful. Application of these methods is usually limited by the cost of the chemicals and their adsorption and loss onto the rock of the oil containing formation.

Some unrefined petroleum contains carboxylic acids having, for example, $C_{11}$ to $C_{20}$ alkyl chains, including napthenic acid mixtures. The recovery of such "reactive" oils may be performed using alkali (e.g. NaOH or $Na_2CO_3$) in a surfactant composition. The alkali reacts with the acid in the reactive oil to form soap in situ. These in situ generated soaps serve as an additional source of surfactants enabling the use of much lower level of surfactants initially added to effect enhanced oil recovery (EOR). However, when the available water supply is hard, the added alkali causes precipitation of cations, such as $Ca^{-2}$ or $Mg^{+2}$. In order to prevent such precipitation an expensive chelant such as EDTA may be required in the surfactant composition. Alternatively, water softening processes may be used.

Therefore, there is a need in the art for cost effective methods for enhanced oil recovery using chemical injection. Provided herein are methods and compositions addressing these and other needs in the art.

BRIEF SUMMARY OF THE INVENTION

The compositions provided herein include a surfactant and a co-solvent having the formula I, II, or III and are particularly useful for oil recovery under a broad range of reservoir conditions (e.g. high to low temperatures, high to low salinity, highly viscous oils). Compared to existing surfactant compositions used in the art, the aqueous compositions according to the embodiments provided herein are highly versatile and cost effective.

In one aspect, an aqueous composition including water, a surfactant and a co-solvent having the formula:

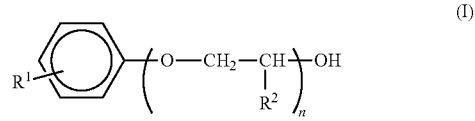

is provided. In formula (I) $R^1$ is independently hydrogen or unsubstituted $C_1$-$C_6$ alkyl, $R^2$ is independently hydrogen or unsubstituted $C_1$-$C_2$ alkyl and n is an integer from 1 to 30.

In one aspect, an aqueous composition including water, a surfactant and a co-solvent having the formula:

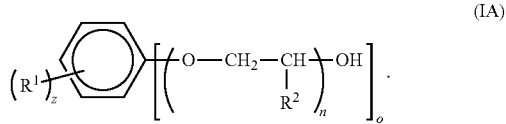

In formula (IA) $R^1$ is independently hydrogen, unsubstituted $C_1$-$C_6$ alkyl or $R^5$—OH, $R^2$ is independently hydrogen or unsubstituted $C_1$-$C_2$ alkyl, $R^5$ is independently a bond or unsubstituted $C_1$-$C_6$ alkyl, n is an integer from 1 to 30, o is an integer from 1 to 5 and z is an integer from 1 to 5.

In another aspect, an emulsion composition including an unrefined petroleum phase and an aqueous phase is provided. In the emulsion composition the aqueous phase includes water, a surfactant and a co-solvent having the formula

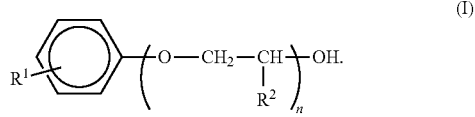

In formula (I) $R^1$ is independently hydrogen or unsubstituted $C_1$-$C_6$ alkyl, $R^2$ is independently hydrogen or unsubstituted $C_1$-$C_2$ alkyl, and n is an integer from 1 to 30.

In another aspect, a method of displacing an unrefined petroleum material in contact with a solid material is provided. The method includes (i) contacting an unrefined petroleum material with the aqueous composition as provided herein including embodiments thereof, wherein the unrefined petroleum material is in contact with a solid material. The unrefined petroleum material is allowed to separate from the solid material thereby displacing the unrefined petroleum material in contact with the solid material.

In another aspect, a method of converting an unrefined petroleum acid into a surfactant is provided. The method includes contacting a petroleum material with the aqueous composition as provided herein including embodiments thereof, thereby forming an emulsion in contact with the petroleum material. The unrefined petroleum acid within the unrefined petroleum material is allowed to enter into the emulsion, thereby converting the unrefined petroleum acid into a surfactant.

DETAILED DESCRIPTION OF THE INVENTION

I. Definitions

Figure 1:
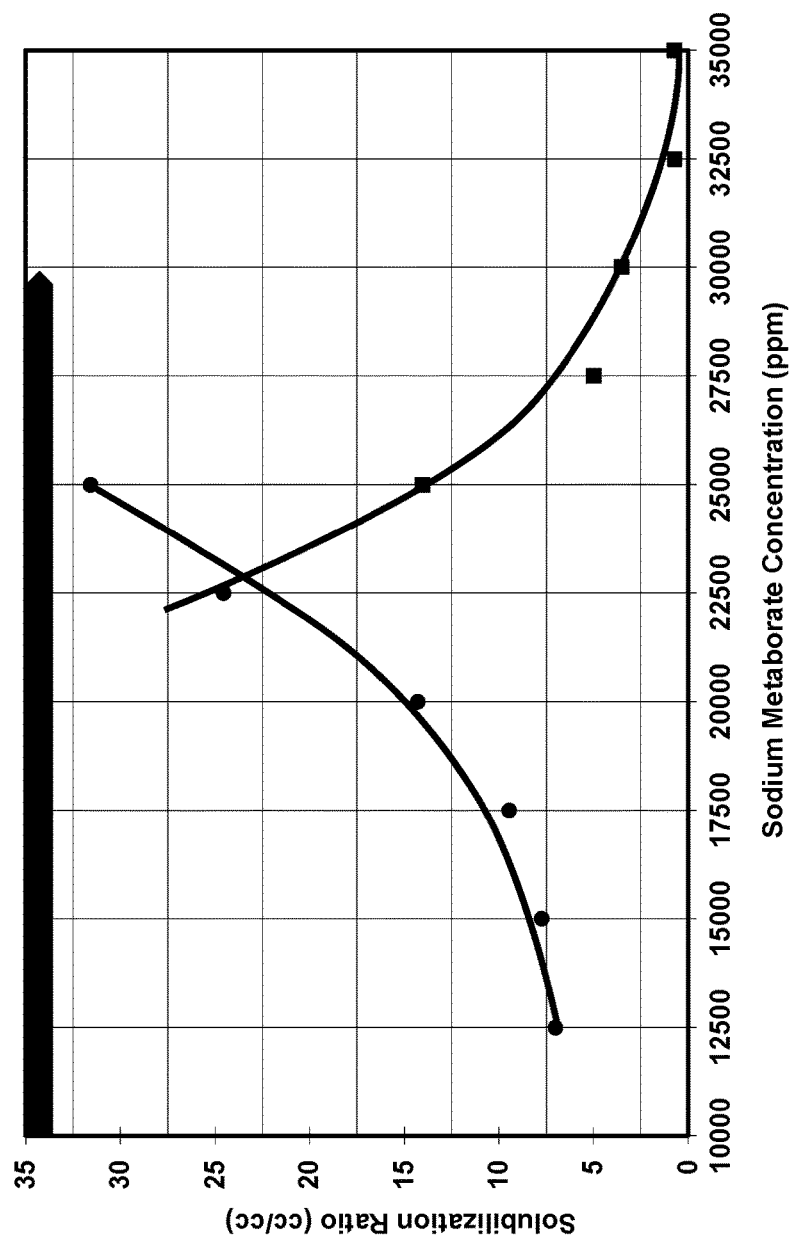
FIG. 1. Phase behavior activity (0.2% $C_{28}$-45PO-10EO carboxylate, 0.3% $C_{19-28}$ IOS, 0.5% IBA-3EO) plot with Oil #2 at 100° C. after 24 days and 30% oil. The black arrow in the histogram pointing from left to right indicates the aqueous stability at 3.0% $NaBO_2$.
Figure 2:
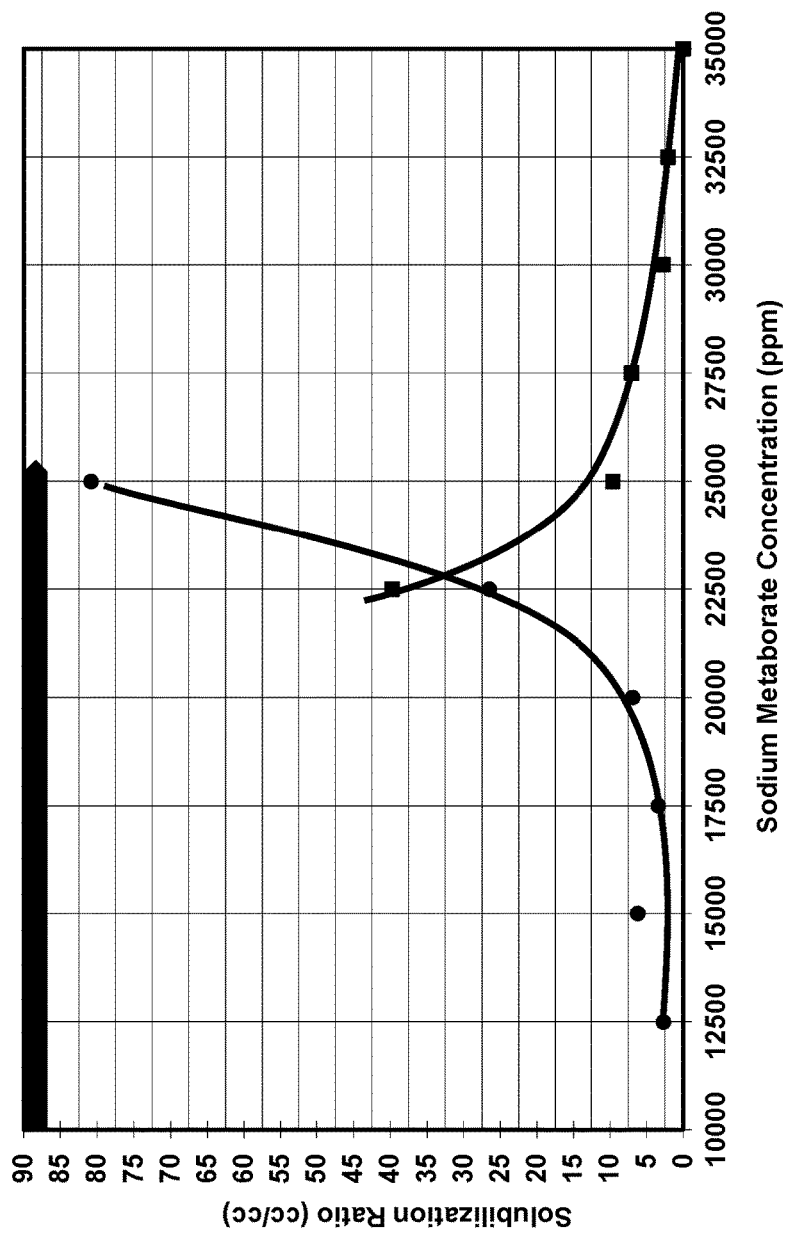
FIG. 2. Phase behavior activity (0.2% $C_{28}$-45PO-10EO carboxylate, 0.3% $C_{19-28}$ IOS, 0.25% Phenol-6EO) plot with Oil #2 at 100° C. after 21 days and 30% oil. The black arrow in the histogram pointing from left to right indicates the aqueous stability at 2.5% $NaBO_2$.
Figure 3:
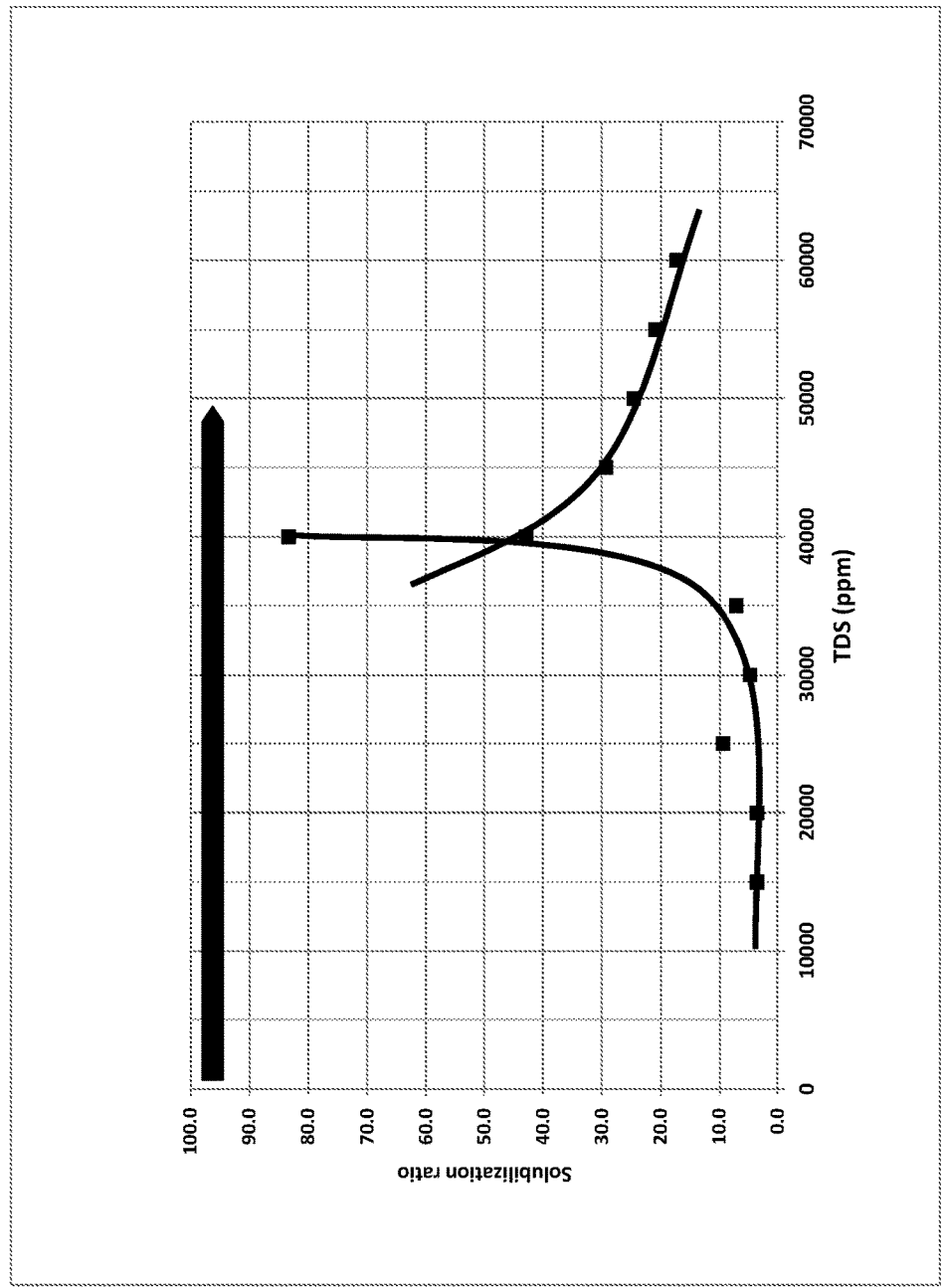
FIG. 3. Phase behavior activity (0.5% $C_{19-23}$ IOS, 0.5% $C_{12-13}$ 13PO-sulfate, 1% IBA-5EO) plot with Oil #1 at 55° C. after 17 days and 30% oil. The black arrow in the histogram pointing from left to right indicates the aqueous stability at 48,000 ppm (TDS).
Figure 4:
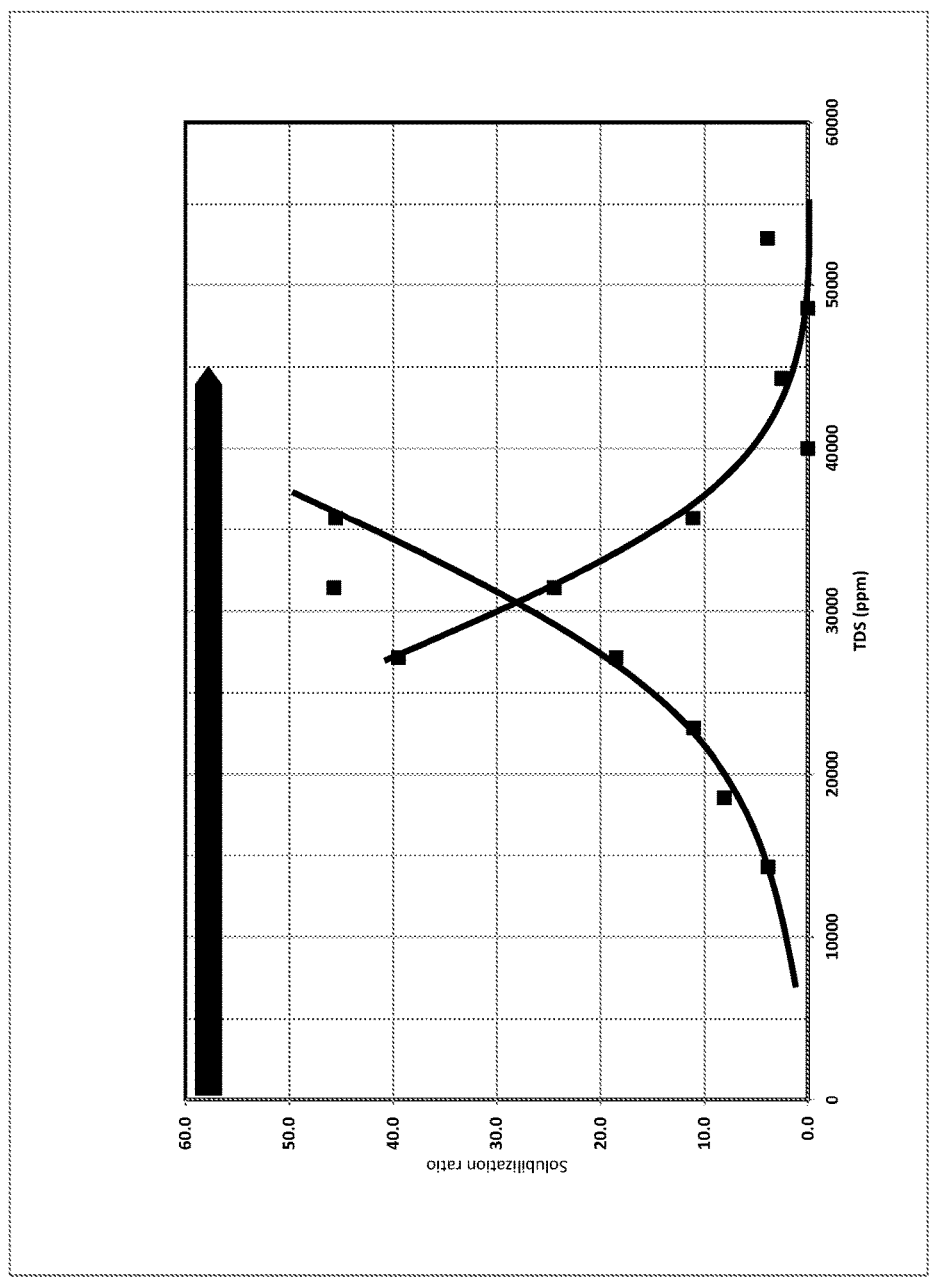
FIG. 4. Phase behavior activity (0.5% $C_{19-23}$ IOS, 0.5% $C_{12-13}$ 13PO-sulfate, 0.5% Phenol-6EO) plot with Oil #1 at 55° C. after 34 days and 30% oil. The black arrow in the histogram pointing from left to right indicates the aqueous stability at 46,000 ppm (TDS).

The abbreviations used herein have their conventional meaning within the chemical and biological arts.

Where substituent groups are specified by their conventional chemical formulae, written from left to right, they equally encompass the chemically identical substituents that would result from writing the structure from right to left, e.g., —$CH_2O$— is equivalent to —$OCH_2$—.

The term "alkyl," by itself or as part of another substituent, means, unless otherwise stated, a straight (i.e. unbranched) or branched chain which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1, 4-pentadienyl), ethynyl, 1- and 3-propynyl, 3-butynyl, and the higher homologs and isomers. Alkyl groups which are limited to hydrocarbon groups are termed "homoalkyl". An alkoxy is an alkyl attached to the remainder of the molecule via an oxygen linker (—O—).

The term "alkylene" by itself or as part of another substituent means a divalent radical derived from an alkyl, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The term "heteroalkyl," by itself or in combination with another term, means, unless otherwise stated, a stable straight or branched chain or combinations thereof, consisting of at least one carbon atom and at least one heteroatom selected from the group consisting of O, N, P, Si and S. The heteroatom(s) O, N, P and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, CH=CH—O—$CH_3$, —Si($CH_3$)$_3$, —$CH_2$—CH=N—$OCH_3$, —CH=CH—N($CH_3$)—$CH_3$, O—$CH_3$, —O—$CH_2$—$CH_3$, and —CN. Up to two heteroatoms may be consecutive, such as, for example, —$CH_2$—NH—$OCH_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "cycloalkyl" and "heterocycloalkyl," by themselves or in combination with other terms, represent, unless otherwise stated, cyclic versions of "alkyl" and "heteroalkyl," respectively. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent means a divalent radical derived from a cycloalkyl and heterocycloalkyl, respectively.

The term "aryl" means, unless otherwise stated, a polyunsaturated, aromatic, hydrocarbon substituent which can be a single ring or multiple rings (preferably from 1 to 3 rings) which are fused together (i.e. a fused ring aryl) or linked covalently. A fused ring aryl refers to multiple rings fused together wherein at least one of the fused rings is an aryl ring. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. Thus, the term "heteroaryl" includes fused ring heteroaryl groups (i.e. multiple rings fused together wherein at least one of the fused rings is a heteroaromatic ring). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An "arylene" and a "heteroarylene," alone or as part of another substituent means a divalent radical derived from an aryl and heteroaryl, respectively.

The term "oxo" as used herein means an oxygen that is double bonded to a carbon atom.

Each R-group as provided in the formulae provided herein can appear more than once. Where a R-group appears more than once each R group can be optionally different.

The term "contacting" as used herein, refers to materials or compounds being sufficiently close in proximity to react or interact. For example, in methods of contacting a hydrocarbon material bearing formation and/or a well bore, the term "contacting" includes placing an aqueous composition (e.g. chemical, surfactant or polymer) within a hydrocarbon material bearing formation using any suitable manner known in the art (e.g., pumping, injecting, pouring, releasing, displacing, spotting or circulating the chemical into a well, well bore or hydrocarbon bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e. organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) and market price in comparison to light (or sweet) crude oils. Crude oil may also be characterized by its Equivalent Alkane Carbon Number (EACN).

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified intro three groups, according to the nature of the hydrocarbons they contain. (i) Paraffin based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil as referred to herein is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbon material or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$ to $C_{20}$ alkyl chains, including napthenic acid mixtures. The recovery of such "reactive" oils may be performed using alkali (e.g. NaOH or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "bonded" refers to having at least one of covalent bonding, hydrogen bonding, ionic bonding, Van Der Waals interactions, pi interactions, London forces or electrostatic interactions.

The term "productivity" as applied to a petroleum or oil well refers to the capacity of a well to produce hydrocarbons (e.g. unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g. precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water.

In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick," having a higher viscosity. More generally, the less viscous a fluid is, the greater its ease of fluidity.

The term "salinity" as used herein, refers to concentration of salt dissolved in a aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

An "alkali agent" is used according to its conventional meaning and includes basic, ionic salts of alkali metals or alkaline earth metals. Alkali agents as provided herein are typically capable of reacting with an unrefined petroleum acid (e.g. the acid in crude oil (reactive oil)) to form soap (a surfactant salt of a fatty acid) in situ. These in situ generated soaps serve as a source of surfactants causing a reduction of the interfacial tension of the oil in water emulsion, thereby reducing the viscosity of the emulsion. Examples of alkali agents useful for the provided invention include, but are not limited to, sodium hydroxide, sodium carbonate, sodium silicate, sodium metaborate, and EDTA tetrasodium salt.

A "microemulsion" as referred to herein is a thermodynamically stable mixture of oil, water, and a stabilizing agents such as a surfactant or a co-solvent that may also include additional components such as alkali agents, polymers (e.g. water-soluble polymers) and a salt. In contrast, a "macroemulsion" as referred to herein is a thermodynamically unstable mixture of oil and water that may also include additional components. An "emulsion" as referred to herein may be a microemulsion or a macroemulsion.

II. Compositions

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not limit the scope of the invention.

Provided herein, inter alia, are aqueous compositions and methods of using the same for a variety of applications including enhanced oil recovery. The aqueous compositions provided herein may be used with broad oil concentrations, and at a wide range of salinities, including high salinities such as hard brine. The aqueous compositions according to the embodiments provided herein further promote the formation of emulsions and reduce the viscosity (interfacial viscosity as well as bulk viscosity) of such emulsions, resulting in high oil recovery efficiencies. The compositions provided herein are particularly useful for the recovery of heavy oils (e.g. oils with less than 20° API gravity or a viscosity of more than 400 mPa s).

In one aspect, an aqueous composition including water, a surfactant and a co-solvent having the formula:

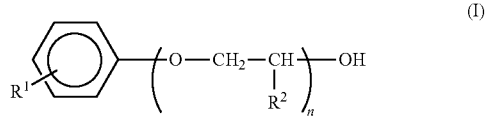

is provided. In formula (I) $R^1$ is independently hydrogen or unsubstituted $C_1$-$C_6$ alkyl, $R^2$ is independently hydrogen or unsubstituted $C_1$-$C_2$ alkyl and n is an integer from 1 to 30. In some embodiments, $R^1$ is unsubstituted $C_2$-$C_6$ alkyl. In some embodiments, $R^1$ is unsubstituted $C_1$-$C_6$ alkyl. In some embodiments, $R^1$ is unsubstituted $C_1$-$C_5$ alkyl. In other embodiments, $R^1$ is unsubstituted $C_1$-$C_4$ alkyl. In other embodiments, $R^1$ is unsubstituted $C_1$-$C_3$ alkyl. In some embodiments, $R^1$ is unsubstituted $C_1$-$C_2$ alkyl. In some embodiments, $R^1$ is unsubstituted $C_2$ alkyl. In other embodiments, $R^1$ is ethyl. In some embodiments, $R^1$ is methyl. In some embodiment, $R^1$ is hydrogen.

$R^1$ may be linear or branched unsubstituted alkyl. In one embodiment, $R^1$ of formula (I) is linear unsubstituted $C_1$-$C_6$ alkyl. In one embodiment, $R^1$ of formula (I) is branched unsubstituted $C_1$-$C_6$ alkyl. In other embodiments, $R^1$ of formula (I) is linear unsubstituted $C_1$-$C_5$ alkyl. In other embodiments, $R^1$ of formula (I) is branched unsubstituted $C_1$-$C_5$ alkyl. In other embodiments, $R^1$ of formula (I) is linear unsubstituted $C_1$-$C_4$ alkyl. In other embodiments, $R^1$ of formula (I) is branched unsubstituted $C_1$-$C_4$ alkyl. In other embodiments, $R^1$ of formula (I) is linear unsubstituted $C_1$-$C_3$ alkyl. In other embodiments, $R^1$ of formula (I) is branched unsubstituted $C_1$-$C_3$ alkyl. In other embodiments, $R^1$ of formula (I) is linear unsubstituted ethyl. In other embodiments, $R^1$ of formula (I) is branched unsubstituted ethyl.

In one embodiment, where $R^1$ is linear or branched unsubstituted alkyl (e.g. branched unsubstituted $C_1$-$C_6$ alkyl), the alkyl is a saturated alkyl (e.g. a linear or branched unsubstituted saturated alkyl or branched unsubstituted $C_1$-$C_6$ saturated alkyl). A "saturated alkyl," as used herein, refers to an alkyl consisting only of hydrogen and carbon atoms that are bonded exclusively by single bonds. Thus, in one embodiment, $R^1$ is linear or branched unsubstituted saturated alkyl. In one embodiment, $R^1$ of formula (I) is linear unsubstituted saturated $C_1$-$C_6$ alkyl. In one embodiment, $R^1$ of formula (I) is branched unsubstituted saturated $C_1$-$C_6$ alkyl. In other embodiments, $R^1$ of formula (I) is linear unsubstituted saturated $C_1$-$C_5$ alkyl. In other embodiments, $R^1$ of formula (I) is branched unsubstituted saturated $C_1$-$C_5$ alkyl. In other embodiments, $R^1$ of formula (I) is linear unsubstituted saturated $C_1$-$C_4$ alkyl. In other embodiments, $R^1$ of formula (I) is branched unsubstituted saturated $C_1$-$C_4$ alkyl. In other embodiments, $R^1$ of formula (I) is linear unsubstituted saturated $C_1$-$C_3$ alkyl. In other embodiments, $R^1$ of formula (I) is branched unsubstituted saturated $C_1$-$C_3$ alkyl. In other embodiments, $R^1$ of formula (I) is linear unsubstituted saturated ethyl. In other embodiments, $R^1$ of formula (I) is branched unsubstituted saturated ethyl.

The symbol n is an integer from 1 to 30. In one embodiment, n is an integer from 1 to 25. In one embodiment, n is an integer from 1 to 20. In one embodiment, n is an integer from 1 to 15. In one embodiment, n is an integer from 1 to 10. In one embodiment, n is an integer from 1 to 5. In some embodiment, n is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In one embodiment, n is 3. In other embodiments, n is 5. In one embodiment, n is 6.

In some embodiments, $R^1$ is hydrogen. In other related embodiments, n is as defined in an embodiment above (e.g. n is at least 1, or at least 20, e.g. 5 to 15). Thus, in some embodiments, $R^1$ is hydrogen and n is 6.

In some embodiments, $R^1$ is methyl. In other related embodiments, n is as defined in an embodiment above (e.g. n is at least 1, or at least 20, e.g. 5 to 10). Thus, in some embodiments, $R^1$ is methyl and n is 6.

In one aspect, an aqueous composition including water, a surfactant and a co-solvent having the formula:

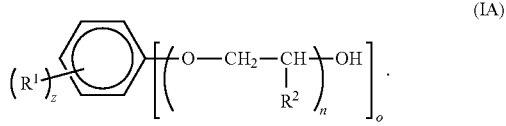

(IA)

In formula (IA) $R^1$ is independently hydrogen, unsubstituted $C_1$-$C_6$ alkyl or $R^5$—OH, $R^2$ is independently hydrogen or unsubstituted $C_1$-$C_2$ alkyl, $R^5$ is independently a bond or unsubstituted $C_1$-$C_6$ alkyl, n is an integer from 1 to 30, o is an integer from 1 to 5 and z is an integer from 1 to 5. In some embodiments, $R^1$ is unsubstituted $C_2$-$C_6$ alkyl. In some embodiments, $R^1$ is unsubstituted $C_4$-$C_6$ alkyl. In some embodiments, $R^1$ is unsubstituted $C_1$-$C_5$ alkyl. In other embodiments, $R^1$ is unsubstituted $C_1$-$C_4$ alkyl. In other embodiments, $R^1$ is unsubstituted $C_1$-$C_3$ alkyl. In some embodiments, $R^1$ is unsubstituted $C_1$-$C_2$ alkyl. In some embodiments, $R^1$ is unsubstituted $C_2$ alkyl. In other embodiments, $R^1$ is ethyl. In some embodiments, $R^1$ is methyl. In some embodiment, $R^1$ is hydrogen.

In some embodiment, $R^1$ is independently a bond or $R^5$—OH. In some embodiment, $R^1$ is $R^5$—OH. In some embodiments, $R^5$ is unsubstituted $C_2$-$C_6$ alkyl. In some embodiments, $R^5$ is unsubstituted $C_4$-$C_6$ alkyl. In some embodiments, $R^5$ is unsubstituted $C_1$-$C_5$ alkyl. In other embodiments, $R^5$ is unsubstituted $C_1$-$C_4$ alkyl. In other embodiments, $R^5$ is unsubstituted $C_1$-$C_3$ alkyl. In some embodiments, $R^5$ is unsubstituted $C_1$-$C_2$ alkyl. In some embodiments, $R^5$ is unsubstituted $C_2$ alkyl. In other embodiments, $R^5$ is ethyl. In some embodiments, $R^5$ is methyl. In some embodiments, $R^5$ is a bond.

In formula (IA) the symbol n is an integer from 1 to 30. In one embodiment, n is an integer from 1 to 25. In one embodiment, n is an integer from 1 to 20. In one embodiment, n is an integer from 1 to 15. In one embodiment, n is an integer from 1 to 10. In one embodiment, n is an integer from 1 to 5. In some embodiment, n is 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30. In one embodiment, n is 3. In other embodiments, n is 5. In one embodiment, n is 6. In one embodiment, n is 16.

In formula (IA) the symbol o is an integer from 1 to 5 and the symbol z is an integer from 1 to 5. In embodiments, o is 1, 2, 3, 4, or 5. In embodiments, z is 1, 2, 3, 4, or 5. In embodiments, o is 1 and z is 5. In further embodiments, $R^1$ is independently hydrogen or $R^5$—OH and $R^5$ is a bond. In other further embodiments, $R^1$ is hydrogen. In other further embodiments, $R^1$ is $R^5$—OH and $R^5$ is a bond.

In formula (I), (IA), (II) or (III) $R^2$ may be independently hydrogen or unsubstituted $C_1$-$C_2$ alkyl. In some embodiments, $R^2$ is hydrogen or unsubstituted $C_1$ or $C_2$ alkyl. In some related embodiments, $R^2$ is hydrogen or branched unsubstituted $C_1$ or $C_2$ saturated alkyl. In some embodiments, $R^2$ is hydrogen or a branched unsubstituted $C_1$ saturated alkyl. In some embodiments, $R^2$ is independently hydrogen or methyl. In other embodiments, $R^2$ is independently hydrogen or ethyl. In some embodiments, $R^2$ is independently hydrogen, methyl or ethyl. In some embodiments, $R^2$ is hydrogen. In some embodiments, $R^2$ is methyl. In some embodiments, $R^2$ is ethyl. In formula (I) $R^2$ can appear more than once and can be optionally different. For example, in some embodiments where n is 3, $R^2$ appears three times and can be optionally different. In other embodiments, where n is 6, $R^2$ appears six times and can be optionally different.

In some embodiments, where multiple $R^2$ substituents are present and at least two $R^2$ substituents are different, $R^2$ substituents with the fewest number of carbons are present at the side of the compound of formula (I), (IA), (II) or (III) bound to the —OH group. In this embodiment, the compound of formula (I), (IA), (II) or (III) will be increasingly hydrophilic in progressing from the $R^1$ substituent to the side of the compound of formula (I), (IA), (II) or (III) bound to the —OH group. The term "side of the compound of formula (I), (IA), (II) or (III) bound to the —OH group" refers to the side of the compound indicated by asterisks in the below structures:

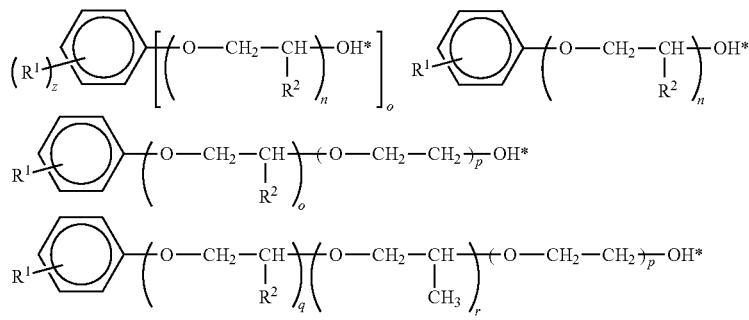

In some embodiments, $R^2$ is hydrogen. In other related embodiments, n is as defined in an embodiment above (e.g. n is at least 1, or at least 20, e.g. 5 to 15). Thus, in some embodiments, $R^2$ is hydrogen and n is 6.

In some embodiments, $R^2$ is methyl. In other related embodiments, n is as defined in an embodiment above (e.g. n is at least 1, or at least 20, e.g. 5 to 10). Thus, in some embodiments, $R^2$ is methyl and n is 6.

In some embodiment, the co-solvent has the formula:

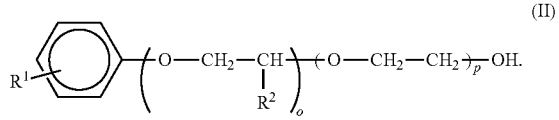

(II)

In formula (II) $R^1$ is defined as above (e.g. unsubstituted $C_1$-$C_6$ alkyl), $R^2$ is methyl or ethyl, o is an integer from 0 to 15 and p is an integer from 1 to 10. In some embodiments, $R^2$ is methyl. In other embodiments, $R^2$ is ethyl. In formula (II) $R^2$ can appear more than once and can be optionally different. For example, in some embodiments where o is 3, $R^2$ appears three times and can be optionally different. In other embodiments, where o is 6, $R^2$ appears six times and can be optionally different.

In some embodiments, o is 0 to 15. In some related embodiments, o is 0 to 12. In some related embodiments, o is 0 to 10. In some related embodiments, o is 0 to 8. In some related embodiments, o is 0 to 6. In some related embodiments, o is 0 to 4. In some related embodiments, o is 0 to 2. In still further related embodiments, o is 0. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. In some further embodiment, p is 6. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl). Thus, in some embodiment, $R^1$ is hydrogen, o is 0 and p is 6.

In some embodiments, o is 1 to 15. In some related embodiments, o is 1 to 12. In some related embodiments, o is 1 to 10. In some related embodiments, o is 1 to 8. In some related embodiments, o is 1 to 6. In some related embodiments, o is 1 to 4. In some related embodiments, o is 1 to 2. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiments, o is 2 to 15. In some related embodiments, o is 2 to 12. In some related embodiments, o is 2 to 10. In some related embodiments, o is 2 to 8. In some related embodiments, o is 2 to 6. In some related embodiments, o is 2 to 4. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiments, o is 4 to 15. In some related embodiments, o is 4 to 12. In some related embodiments, o is 4 to 10. In some related embodiments, o is 4 to 8. In some related embodiments, o is 4 to 6. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiments, o is 6 to 15. In some related embodiments, o is 6 to 12. In some related embodiments, o is 6 to 10. In some related embodiments, o is 6 to 8. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiments, o is 8 to 15. In some related embodiments, o is 8 to 12. In some related embodiments, o is 8 to 10. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiments, o is 10 to 15. In some related embodiments, o is 10 to 12. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiments, o is 12 to 15. In some further related embodiment, p is 1 to 10. In some further related embodiment, p is 1 to 8. In some further related embodiment, p is 1 to 6. In some further related embodiment, p is 1 to 4. In some further related embodiment, p is 1 to 2. In still some further related embodiment, p is more than 1. $R^1$ and $R^2$ may be any of the embodiments described above (e.g. $R^1$ maybe linear unsubstituted $C_1$-$C_6$ alkyl, $R^2$ maybe linear unsubstituted $C_1$-$C_2$ alkyl).

In some embodiment, the co-solvent has the formula:

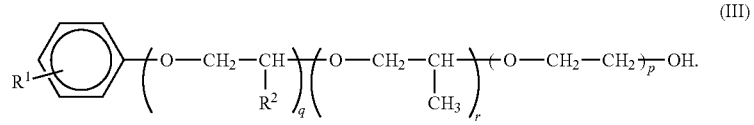

(III)

In formula (III) $R^1$ is defined as above (e.g. unsubstituted $C_1$-$C_6$ alkyl), $R^2$ is ethyl, q is an integer from 0 to 10, r is an integer from 0 to 10 and p is an integer from 1 to 10.

In some embodiment, q is 0 to 10. In some related embodiment, q is 1 to 10. In some related embodiment, q is 2 to 10. In some related embodiment, q is 3 to 10. In some related embodiment, q is 4 to 10. In some related embodiment, q is 5 to 10. In some related embodiment, q is 6 to 10. In some related embodiment, q is 7 to 10. In some related embodiment, q is 8 to 10. In some related embodiment, q is 9 to 10. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 9. In some related embodiment, q is 1 to 9. In some related embodiment, q is 2 to 9. In some related embodiment, q is 3 to 9. In some related embodiment, q is 4 to 9. In some related embodiment, q is 5 to 9. In some related embodiment, q is 6 to 9. In some related embodiment, q is 7 to 9. In some related embodiment, q is 8 to 9. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 8. In some related embodiment, q is 1 to 8. In some related embodiment, q is 2 to 8. In some related embodiment, q is 3 to 8. In some related embodiment, q is 4 to 8. In some related embodiment, q is 5 to 8. In some related embodiment, q is 6 to 8. In some related embodiment, q is 7 to 8. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 7. In some related embodiment, q is 1 to 7. In some related embodiment, q is 2 to 7. In some related embodiment, q is 3 to 7. In some related embodiment, q is 4 to 7. In some related embodiment, q is 5 to 7. In some related embodiment, q is 6 to 7. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 6. In some related embodiment, q is 1 to 6. In some related embodiment, q is 2 to 6. In some related embodiment, q is 3 to 6. In some related embodiment, q is 4 to 6. In some related embodiment, q is 5 to 6. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 5. In some related embodiment, q is 1 to 5. In some related embodiment, q is 2 to 5. In some related embodiment, q is 3 to 5. In some related embodiment, q is 4 to 5. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 4. In some related embodiment, q is 1 to 4. In some related embodiment, q is 2 to 4. In some related embodiment, q is 3 to 4. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 3. In some related embodiment, q is 1 to 3. In some related embodiment, q is 2 to 3. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment,
p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

In some embodiment, q is 0 to 2. In some related embodiment, q is 1 to 2. Moreover, in still further related embodiments, q is 0. In some further related embodiment, r is 0 to 10. In some further related embodiment, r is 1 to 10. In some further related embodiment, r is 2 to 10. In some further related embodiment, r is 3 to 10. In some further related embodiment, r is 4 to 10. In some further related embodiment, r is 5 to 10. In some further related embodiment, r is 6 to 10. In some further related embodiment, r is 7 to 10. In some further related embodiment, r is 8 to 10. In some further related embodiment, r is 9 to 10. Moreover, in still further related embodiments, r is 0. In still some further embodiment, p is 1 to 10. In still some further embodiment, p is 2 to 10. In still some further embodiment, p is 3 to 10. In still some further embodiment, p is 4 to 10. In still some further embodiment, p is 5 to 10. In still some further embodiment, p is 6 to 10. In still some further embodiment, p is 7 to 10. In still some further embodiment, p is 8 to 10. In still some further embodiment, p is 9 to 10. $R^1$ and $R^2$ may be any of the embodiments described above (e.g. $R^1$ maybe linear unsubstituted $C_1$-$C_6$ alkyl or hydrogen, $R^2$ maybe linear unsubstituted $C_1$-$C_2$ alkyl).

The aqueous composition provided herein including embodiments thereof includes a surfactant. The surfactant provided herein may be any appropriate surfactant useful in the field of enhanced oil recovery. In some embodiments, the surfactant is a single surfactant type in the aqueous composition. In other embodiments, the aqueous composition includes a plurality of different surfactants. Where the aqueous composition includes a plurality of different surfactants the aqueous composition may include a surfactant blend. A "surfactant blend" as provided herein is a mixture of a plurality of surfactant types. In some embodiments, the surfactant blend includes a first surfactant type, a second surfactant type or a third surfactant type. The first, second and third surfactant type may be independently different (e.g. anionic or cationic surfactants; or two anionic surfactants having a different hydrocarbon chain length but are otherwise the same). Therefore, a person having ordinary skill in the art will immediately recognize that the terms "surfactant" and "surfactant type(s)" have the same meaning and can be used interchangeably. In some embodiments, the plurality of different surfactants includes an anionic surfactant, a non-ionic surfactant, a zwitterionic surfactant or a cationic surfactant. In some embodiments, the surfactant is an anionic surfactant, a non-ionic surfactant, or a cationic surfactant. In other embodiments, the co-surfactant is a zwitterionic surfactant. "Zwitterionic" or "zwitterion" as used herein refers to a neutral molecule with a positive (or cationic) and a negative (or anionic) electrical charge at different locations within the same molecule. Examples for zwitterionics are without limitation betains and sultains.

The surfactant provided herein may be any appropriate anionic surfactant. In some embodiments, the surfactant is an anionic surfactant. In some embodiments, the anionic surfactant is an anionic surfactant blend. Where the anionic surfactant is an anionic surfactant blend the aqueous composition includes a plurality (i.e. more than one) of anionic surfactant types. In some embodiments, the anionic surfactant is an alkoxy carboxylate surfactant, an alkoxy sulfate surfactant, an alkoxy sulfonate surfactant, an alkyl sulfonate surfactant, an aryl sulfonate surfactant or an olefin sulfonate surfactant. An "alkoxy carboxylate surfactant" as provided herein is a compound having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$COO^-$ or acid or salt thereof including metal cations such as sodium. In some embodiments, the alkoxy carboxylate surfactant has the formula:

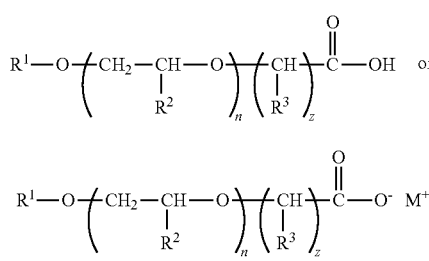

In formula (IV) or (V) $R^1$ is substituted or unsubstituted $C_8$-$C_{150}$ alkyl or substituted or unsubstituted aryl, $R^2$ is independently hydrogen or unsubstituted $C_1$-$C_6$ alkyl, $R^3$ is independently hydrogen or unsubstituted $C_1$-$C_6$ alkyl, n is an integer from 2 to 210, z is an integer from 1 to 6 and $M^+$ is a monovalent, divalent or trivalent cation. In some embodiments, $R^1$ is unsubstituted linear or branched $C_8$-$C_{36}$ alkyl. In some embodiments, $R^1$ is ($C_6H_5$—$CH_2CH_2$)$_3C_6H_2$- (TSP), ($C_6H_5$—$CH_2CH_2$)$_2C_6H_3$— (DSP), ($C_6H_5$—$CH_2CH_2$)$_1C_6H_4$— (MSP), or substituted or unsubstituted naphthyl. In some embodiments, the alkoxy carboxylate is $C_{28}$-25PO-25EO-carboxylate (i.e. unsubstituted $C_{28}$ alkyl attached to 25 —$CH_2$—CH(methyl)-O— linkers, attached in turn to 25 —$CH_2$—$CH_2$—O— linkers, attached in turn to —$COO^-$ or acid or salt thereof including metal cations such as sodium).

In some embodiments, the surfactant is an alkoxy sulfate surfactant. An alkoxy sulfate surfactant as provided herein is a surfactant having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkoxy sulfate surfactant has the formula $R^4$—(BO)$_e$—(PO)$_f$—(EO)$_g$—$SO_3^-$ or acid or salt (including metal cations such as sodium) thereof, wherein $R^4$ is $C_8$-$C_{30}$ alkyl, BO is —$CH_2$—CH(ethyl)-O—, PO is —$CH_2$—CH(methyl)-O—, and EO is —$CH_2$—$CH_2$—O—. The symbols e, f and g are integers from 0 to 25 wherein at least one is not zero. In some embodiment, the alkoxy sulfate surfactant is $C_{15}$-13PO-sulfate (i.e. an unsubstituted $C_{15}$ alkyl attached to 13 —$CH_2$—CH(methyl)-O— linkers, in turn attached to —$SO_3^-$ or acid or salt thereof including metal cations such as sodium).

In other embodiments, the alkoxy sulfate surfactant has the formula

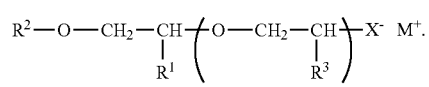

In formula (VI) $R^1$ and $R^2$ are independently substituted or unsubstituted $C_8$-$C_{150}$ alkyl or substituted or unsubstituted aryl. $R^3$ is independently hydrogen or unsubstituted $C_1$-$C_6$ alkyl. z is an integer from 2 to 210. $X^-$ is

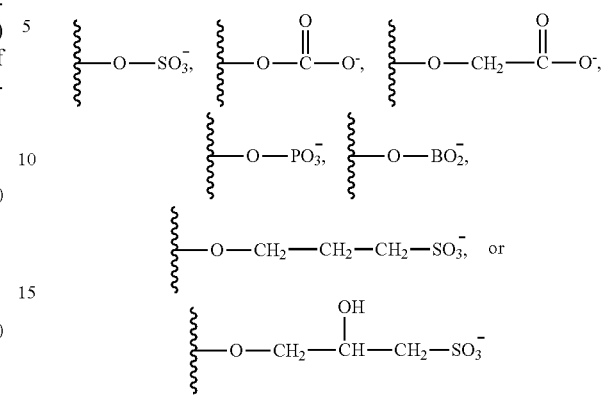

and $M^+$ is a monovalent, divalent or trivalent cation. In some embodiments, $R^1$ is branched unsubstituted $C_8$-$C_{150}$. In other embodiments, $R^1$ is branched or linear unsubstituted $C_{12}$-$C_{100}$ alkyl, ($C_6H_5$—$CH_2CH_2$)$_3C_6H_2$-(TSP), ($C_6H_5$—$CH_2CH_2$)$_2C_6H_3$— (DSP), ($C_6H_5$—$CH_2CH_2$)$_1C_6H_4$— (MSP), or substituted or unsubstituted naphthyl. In some embodiments, the alkoxy sulfate is $C_{16}$-$C_{16}$-epoxide-15PO-10EO-sulfate (i.e. a linear unsubstituted $C_{16}$ alkyl attached to an oxygen, which in turn is attached to a branched unsubstituted $C_{16}$ alkyl, which in turn is attached to 15 —$CH_2$—CH(methyl)-O— linkers, in turn attached to 10 —$CH_2$—$CH_2$—O— linkers, in turn attached to —$SO_3^-$ or acid or salt thereof including metal cations such as sodium.

The alkoxy sulfate surfactant provided herein may be an aryl alkoxy sulfate surfactant. An aryl alkoxy surfactant as provided herein is an alkoxy surfactant having an aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiments, the aryl alkoxy sulfate surfactant is ($C_6H_5$—$CH_2CH_2$)$_3C_6H_2$-7PO-10EO-sulfate (i.e. tri-styryl-phenol attached to 7 —$CH_2$—CH(methyl)-O— linkers, in turn attached to 10 —$CH_2$—$CH_2$—O— linkers, in turn attached to —$SO_3^-$ or acid or salt thereof including metal cations such as sodium).

In some embodiments, the surfactant is an unsubstituted alkyl sulfate or an unsubstituted alkyl sulfonate surfactant. An alkyl sulfate surfactant as provided herein is a surfactant having an alkyl group attached to —O—$SO_3^-$ or acid or salt thereof including metal cations such as sodium. An alkyl sulfonate surfactant as provided herein is a surfactant having an alkyl group attached to —$SO_3^-$ or acid or salt thereof including metal cations such as sodium. In some embodiments, the surfactant is an unsubstituted aryl sulfate surfactant or an unsubstituted aryl sulfonate surfactant. An aryl sulfate surfactant as provided herein is a surfactant having an aryl group attached to —O—$SO_3^-$ or acid or salt thereof including metal cations such as sodium. An aryl sulfonate surfactant as provided herein is a surfactant having an aryl group attached to —$SO_3^-$ or acid or salt thereof including metal cations such as sodium. In some embodiments, the surfactant is an alkyl aryl sulfonate. Non-limiting examples of alkyl sulfate surfactants, aryl sulfate surfactants, alkyl sulfonate surfactants, aryl sulfonate surfactants and alkyl aryl sulfonate surfactants useful in the embodiments provided herein are alkyl aryl sulfonates (ARS) (e.g. alkyl benzene sulfonate (ABS)), alkane sulfonates, petroleum sulfonates, and alkyl diphenyl oxide (di)sulfonates. Additional surfactants useful in the embodiments provided herein are alcohol sulfates, alkoxy phosphate, sulfosuccinate esters, alcohol ethoxylates, alkyl phenol ethoxylates, quaternary ammonium salts, betains and sultains. In certain embodiments, the surfactant is not an alcohol phosphate surfactant. In specific embodiments, the surfactant is not a phosphate alkyl ester surfactant.

The surfactant as provided herein may be an olefin sulfonate surfactant. In some embodiments, the olefin sulfonate surfactant is an internal olefin sulfonate (IOS) or an alfa olefin sulfonate (AOS). In some embodiments, the olefin sulfonate surfactant is a $C_{10}$-$C_{30}$ (IOS). In some further embodiments, the olefin sulfonate surfactant is $C_{15}$-$C_{18}$ IOS. In other embodiments, the olefin sulfonate surfactant is $C_{19}$-$C_{28}$ IOS. Where the olefin sulfonate surfactant is $C_{15}$-$C_{18}$ IOS, the olefin sulfonate surfactant is a mixture (combination) of $C_{15}$, $C_{16}$, $C_{17}$ and $C_{18}$ alkene, wherein each alkene is attached to a —$SO_3^-$ or acid or salt thereof including metal cations such as sodium. Likewise, where the olefin sulfonate surfactant is $C_{19}$-$C_{28}$ IOS, the olefin sulfonate surfactant is a mixture (combination) of $C_{19}$, $C_{20}$, $C_{21}$ $C_{22}$, $C_{23}$, $C_{24}$, $C_{25}$, $C_{26}$, $C_{27}$ and $C_{28}$ alkene, wherein each alkene is attached to a —$SO_3^-$ or acid or salt thereof including metal cations such as sodium. As mentioned above, the aqueous composition provided herein may include a plurality of surfactants (i.e. a surfactant blend). In some embodiments, the surfactant blend includes a first olefin sulfonate surfactant and a second olefin sulfonate surfactant. In some further embodiments, the first olefin sulfonate surfactant is $C_{15}$-$C_{18}$ IOS and the second olefin sulfonate surfactant is $C_{19}$-$C_{28}$ IOS.

Useful surfactants are disclosed, for example, in U.S. Pat. Nos. 3,811,504, 3,811,505, 3,811,507, 3,890,239, 4,463,806, 6,022,843, 6,225,267, 7,629,299; WIPO Patent Application WO/2008/079855, WO/2012/027757 and WO/2011/094442; as well as U.S. Patent Application Nos. 2005/0199395, 2006/0185845, 2006/018486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, and 2010/0292110. Additional useful surfactants are surfactants known to be used in enhanced oil recovery methods, including those discussed in D. B. Levitt, A. C. Jackson, L. Britton and G. A. Pope, "Identification and Evaluation of High-Performance EOR Surfactants," SPE 100089, conference contribution for the SPE Symposium on Improved Oil Recovery Annual Meeting, Tulsa, Okla., Apr. 24-26, 2006.

A person having ordinary skill in the art will immediately recognize that many surfactants are commercially available as blends of related molecules (e.g. IOS and ABS surfactants). Thus, where a surfactant is present within a composition provided herein, a person of ordinary skill would understand that the surfactant may be a blend of a plurality of related surfactant molecules (as described herein and as generally known in the art).

In some embodiment, the total surfactant concentration (i.e. the total amount of all surfactant types within the aqueous compositions and emulsion compositions provided herein) in is from about 0.05% w/w to about 10% w/w. In other embodiments, the total surfactant concentration in the aqueous composition is from about 0.25% w/w to about 10% w/w. In other embodiments, the total surfactant concentration in the aqueous composition is about 0.5% w/w. In other embodiments, the total surfactant concentration in the aqueous composition is about 1.0% w/w. In other embodiments, the total surfactant concentration in the aqueous composition is about 1.25% w/w. In other embodiments, the total surfactant concentration in the aqueous composition is about 1.5% w/w. In other embodiments, the total surfactant concentration in the aqueous composition is about 1.75% w/w. In other embodiments, the total surfactant concentration in the aqueous composition is about 2.0% w/w. In other embodiments, the total surfactant concentration in the aqueous composition is about 2.5% w/w. In other embodiments, the total surfactant concentration in the aqueous composition is about 3.0% w/w. In other embodiments, the total surfactant concentration in the aqueous composition is about 3.5% w/w. In other embodiments, the total surfactant concentration in the aqueous composition is about 4.0% w/w. In other embodiments, the total surfactant concentration in the aqueous composition is about 4.5% w/w. In other embodiments, the total surfactant concentration in the aqueous composition is about 5.0% w/w. In other embodiments, the total surfactant concentration in the aqueous composition is about 5.5% w/w. In other embodiments, the total surfactant concentration in the aqueous composition is about 6.0% w/w. In other embodiments, the total surfactant concentration in the aqueous composition is about 6.5% w/w. In other embodiments, the total surfactant concentration in the aqueous composition is about 7.0% w/w. In other embodiments, the total surfactant concentration in the aqueous composition is about 7.5% w/w. In other embodiments, the total surfactant concentration in the aqueous composition is about 8.0% w/w. In other embodiments, the total surfactant concentration in the aqueous composition is about 9.0% w/w. In other embodiments, the total surfactant concentration in the aqueous composition is about 10% w/w.

In some embodiments, the co-solvent is present in an amount sufficient to increase the solubility of the surfactant in the aqueous phase relative to the absence of the co-solvent. In other words, in the presence of a sufficient amount of the co-solvent, the solubility of the surfactant in the aqueous phase is higher than in the absence of the co-solvent. In other embodiments, the co-solvent is present in an amount sufficient to increase the solubility of the surfactant in the aqueous phase relative to the absence of the co-solvent. Thus, in the presence of a sufficient amount of the co-solvent the solubility of the surfactant in the aqueous phase is higher than in the absence of the co-solvent. In some embodiments, the co-solvent is present in an amount sufficient to decrease the viscosity of the emulsion relative to the absence of the co-solvent.

In one embodiment, the aqueous composition further includes a viscosity enhancing water-soluble polymer. In one embodiment, the viscosity enhancing water-soluble polymer may be a biopolymer such as xanthan gum or scleroglucan, a synthetic polymer such as polyacryamide, hydrolyzed polyarcrylamide or co-polymers of acrylamide and acrylic acid, 2-acrylamido 2-methyl propane sulfonate or N-vinyl pyrrolidone, a synthetic polymer such as poly-ethylene oxide, or any other high molecular weight polymer soluble in water or brine. In one embodiment, the viscosity enhancing water-soluble polymer is polyacrylamide or a co-polymer of polyacrylamide. In one embodiment, the viscosity enhancing water-soluble polymer is a partially (e.g. 20%, 25%, 30%, 35%, 40%, 45%) hydrolyzed anionic polyacrylamide. In some further embodiment, the viscosity enhancing water-soluble polymer has a molecular weight of approximately about $8 \times 10^6$. In some other further embodiment, the viscosity enhancing water-soluble polymer has a molecular weight of approximately about $18 \times 10^6$. Non-limiting examples of commercially available polymers useful for the invention including embodiments provided herein are Florpaam 3330S and Florpaam 3360S.

The aqueous composition provided herein may further include a gas. Thus, in some embodiment, the aqueous composition further includes a gas. For instance, the gas may be combined with the aqueous composition to reduce its mobility by decreasing the liquid flow in the pores of the solid material (e.g. rock). In some embodiments, the gas may be supercritical carbon dioxide, nitrogen, natural gas or mixtures of these and other gases.

In some embodiments, the aqueous composition further includes an alkali agent. An alkali agent as provided herein is a basic, ionic salt of an alkali metal (e.g. lithium, sodium, potassium) or alkaline earth metal element (e.g. magnesium, calcium, barium, radium). In some embodiments, the alkali agent is NaOH, KOH, LiOH, $Na_2CO_3$, $NaHCO_3$, Na-metaborate, Na silicate, Na orthosilicate, or $NH_4OH$. The aqueous composition may include seawater, or fresh water from an aquifer, river or lake. In some embodiments, the aqueous composition includes hard brine or soft brine. In some further embodiments, the water is soft brine. In some further embodiments, the water is hard brine. Where the aqueous composition includes soft brine, the aqueous composition may include an alkaline agent. In soft brine the alkaline agent provides for enhanced soap generation from the active oils, lower surfactant adsorption to the solid material (e.g. rock) in the reservoir and increased solubility of viscosity enhancing water soluble polymers. The alkali agent is present in the aqueous composition at a concentration from about 0.1% w/w to about 10% w/w.

The aqueous composition may include more than 10 ppm of divalent cations combined. In one embodiment, the aqueous composition includes more than 10 ppm of $Ca^{2+}$ and $Mg^{2+}$ combined. The aqueous composition may include more than 100 ppm of divalent cations combined. In one embodiment, the aqueous composition includes more than 1000 ppm of $Ca^{2+}$ and $Mg^{2+}$ combined. In one embodiment, the aqueous composition includes more than 3000 ppm of $Ca^{2+}$ and $Mg^{2+}$ combined.

In one embodiment, the aqueous composition includes more than 10 ppm of cations such as divalent cations. In other embodiments, the aqueous composition includes more than 100 ppm of cations such as divalent cations. In one embodiment, the aqueous composition includes more than 1000 ppm of cations such as divalent cations. In one embodiment, the divalent cations are $Ba^{2+}$, $Fe^{2+}$, $Ca^{2+}$ and $Mg^{2+}$.

In some embodiments, the aqueous composition has a pH of less than about 9.5. In other embodiments, the aqueous composition has a pH of less than about 9.0. In other embodiments, the aqueous composition has a pH of less than about 8.5. In other embodiments, the aqueous composition has a pH of less than about 8. In other embodiments, the aqueous composition has a pH of less than about 7.5. In other embodiments, the aqueous composition has a pH of less than about 10.0. In other embodiments, the aqueous composition has a pH of less than about 11.0. In other embodiments, the aqueous composition has a pH of less than about 12.0.

In some embodiments, the aqueous composition has a salinity of at least 5,000 ppm. In other embodiments, the aqueous composition has a salinity of at least 50,000 ppm. In other embodiments, the aqueous composition has a salinity of at least 150,000 ppm. The total range of salinity (total dissolved solids in the brine) is 100 ppm to saturated brine (about 260,000 ppm). The aqueous composition may include seawater, brine or fresh water from an aquifer, river or lake. The aqueous combination may further include salt to increase the salinity. In some embodiments, the salt is NaCl, KCl, $CaCl_2$, or $MgCl_2$.

In another aspect, an emulsion composition is provided including an unrefined petroleum phase and an aqueous phase. In the emulsion composition the aqueous phase includes water, a surfactant and a co-solvent having the formula

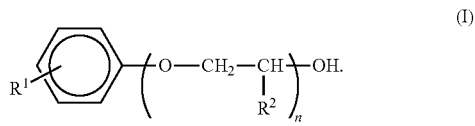

(I)

In formula (I) $R^1$ is independently hydrogen or unsubstituted $C_1$-$C_6$ alkyl, $R^2$ is independently hydrogen or unsubstituted $C_1$-$C_2$ alkyl, and n is an integer from 1 to 30. The co-solvent is a compound according to the embodiments provided herein (e.g. a compound of formula (I), (II), or (III)). In one embodiment, the aqueous phase includes the components set forth in the aqueous composition provided above. For example, in one embodiment, the aqueous phase contains water, a surfactant and a co-solvent. The aqueous phase may include a plurality of different surfactants. In one embodiment, the viscosity of the emulsion composition is less than the viscosity in the absence of the co-solvent. In one embodiment, the viscosity of the emulsion composition is less than 3 times the viscosity of an unrefined petroleum (e.g. the unrefined petroleum which makes up the unrefined petroleum phase of the emulsion composition). In other embodiments, the viscosity of the emulsion composition is less than 30 centipoise. In other embodiments, the viscosity of the emulsion composition is less than 200 centipoise. The co-solvents present in the aqueous phase transform (break down) the initially formed macroemulsion into stable microemulsions thereby allowing for efficient recovery of the crude oil in the petroleum phase. In one embodiment, the emulsion composition is a microemulsion. A "microemulsion" as referred to herein is a thermodynamically stable mixture of oil, water and surfactants that may also include additional components such as co-solvents, electrolytes, alkali and polymers. In contrast, a "macroemulsion" as referred to herein is a thermodynamically unstable mixture of oil and water that may also include additional components.

In some embodiment, the co-solvent has the formula:

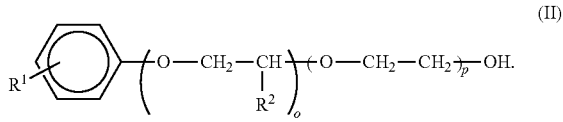

(II)

In formula (II) $R^1$ is defined as above (e.g. unsubstituted $C_1$-$C_6$ alkyl), $R^2$ is methyl or ethyl, o is an integer from 0 to 15 and p is an integer from 1 to 10. In some embodiments, $R^2$ is methyl. In other embodiments, $R^2$ is ethyl. In formula (II) $R^2$ can appear more than once and can be optionally different. For example, in some embodiments where o is 3, $R^2$ appears three times and can be optionally different. In other embodiments, where o is 6, $R^2$ appears six times and can be optionally different.

In another aspect, an emulsion composition is provided including an unrefined petroleum phase and an aqueous phase. In the emulsion composition the aqueous phase includes water, a surfactant and a co-solvent having the formula:

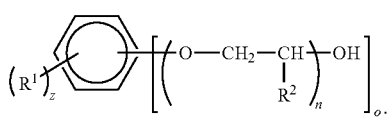

(IA)

In formula (IA) $R^1$ is independently hydrogen, unsubstituted $C_1$-$C_6$ alkyl or $R^5$—OH, $R^2$ is independently hydrogen or unsubstituted $C_1$-$C_2$ alkyl, $R^5$ is independently a bond or unsubstituted $C_1$-$C_6$ alkyl, n is an integer from 1 to 30, o is an integer from 1 to 5 and z is an integer from 1 to 5.

In some embodiments, the co-solvent is present in an amount sufficient to increase the solubility of the surfactant in the aqueous phase relative to the absence of the co-solvent. In other words, in the presence of a sufficient amount of the co-solvent, the solubility of the surfactant in the emulsion composition is higher than in the absence of the co-solvent. In other embodiments, the co-solvent is present in an amount sufficient to increase the solubility of the surfactant in the emulsion composition relative to the absence of the co-solvent. Thus, in the presence of a sufficient amount of the co-solvent the solubility of the surfactant in the emulsion composition is higher than in the absence of the co-solvent. In some embodiments, the co-solvent is present in an amount sufficient to decrease the viscosity of the emulsion relative to the absence of the co-solvent.

In some embodiments, the emulsion composition includes a plurality of different surfactants. As described above, where the emulsion composition includes a plurality of different surfactants the emulsion composition may include a surfactant blend. A "surfactant blend" as provided herein is a mixture of a plurality of surfactant types. In some embodiments, the surfactant blend includes a first surfactant type, a second surfactant type or a third surfactant type. The first, second and third surfactant type may be independently different (e.g. anionic or cationic surfactants; or two anionic surfactants having a different hydrocarbon chain length but are otherwise the same). Therefore, a person having ordinary skill in the art will immediately recognize that the terms "surfactant" and "surfactant type(s)" have the same meaning and can be used interchangeably. In some embodiments, the plurality of different surfactants includes an anionic surfactant, a non-ionic surfactant, a zwitterionic surfactant or a cationic surfactant.

As described above the aqueous composition provided herein including embodiments thereof may include a viscosity enhancing water soluble polymer, a gas and/or an alkali agent. Thus, in some embodiments, the emulsion composition further includes a viscosity enhancing water soluble polymer. In other embodiments, the emulsion composition further includes a gas. In some embodiments, the emulsion composition further includes an alkali agent. In some embodiments, the emulsion composition has a pH of less than 9.5.

In some embodiments, the unrefined petroleum phase includes a nonactive oil.

As described herein the aqueous compositions provided herein include water, a surfactant and a co-solvent having the formula (I), (II), or (III). In one embodiment, the aqueous composition includes water, a first surfactant having the formula (V), wherein $R^1$ is 28, n is 55 (45-$CH_2$—CH (methyl)-O-linkers attached in turn to 10 —$CH_2$—$CH_2$— O— linkers), z is 1 and M is Na$^+$, present at 0.2% (w/w); a second surfactant, wherein the second surfactant is the olefin sulfonate surfactant $C_{19}$-$C_{28}$ IOS, present at 0.3% (w/w); and a cosolvent having the formula (I), wherein $R^1$ and $R^2$ are hydrogen and n is 6, present at 0.25% (w/w).

In another embodiment, the aqueous composition includes water, a first surfactant having the formula $R^A$—(BO)$_e$—(PO)$_f$—(EO)$_g$—$SO_3^-$, wherein $R^A$ is a $C_{12}$ alkyl, e and g are 0 and f is 13; a second surfactant having the formula $R^A$—(BO)$_e$—(PO)$_f$—(EO)$_g$—$SO_3^-$, wherein $R^A$ is a $C_{13}$ alkyl, e and g are 0 and f is 13, wherein the combined total amount of the first surfactant and the second surfactant is 0.5% (w/w); a third surfactant, wherein the second surfactant is the olefin sulfonate surfactant $C_{19}$-$C_{23}$ IOS, present at 0.5% (w/w); and a cosolvent having the formula (I), wherein $R^1$ and $R^2$ are hydrogen and n is 6, present at 0.5% (w/w).

III. Methods

In another aspect, a method of displacing an unrefined petroleum material in contact with a solid material is provided. The method includes contacting an unrefined petroleum material with an aqueous composition, wherein the unrefined petroleum material is in contact with a solid material. The unrefined petroleum material is allowed to separate from the solid material thereby displacing the unrefined petroleum material in contact with the solid material. In some embodiments, the method further includes contacting the solid material with the aqueous composition. The aqueous composition includes water, a surfactant and a co-solvent (as described herein). In other embodiments, the aqueous composition further includes a water-soluble polymer. In other embodiments, the aqueous composition further includes a gas. In other embodiments, the aqueous composition further includes an alkali agent. In one embodiment, the co-solvent has the formula (I). In other embodiments, the co-solvent has the formula (II). In one embodiment, the co-solvent has the formula (III). The co-solvent may be present in an aqueous composition or an emulsion composition as described above. In some embodiments, the co-solvent is present in an amount sufficient to increase the solubility of the surfactant relative to the absence of the co-solvent. In some embodiments, the co-solvent is present in an amount sufficient to decrease the viscosity of the emulsion relative to the absence of the co-solvent.

The solid material may be a natural solid material (i.e. a solid found in nature such as rock). The natural solid material may be found in a petroleum reservoir. In one embodiment, the method is an enhanced oil recovery method. In one embodiment, the natural solid material is rock or regolith. The natural solid material may be a geological formation such as clastics or carbonates. The natural solid material may be either consolidated or unconsolidated material or mixtures thereof. The unrefined active petroleum material may be trapped or confined by "bedrock" above or below the natural solid material. The unrefined active petroleum material may be found in fractured bedrock or porous natural solid material. In other embodiments, the regolith is soil. In some embodiments, the method is an enhanced oil recovery method.

In one embodiment, an emulsion forms after the contacting. The emulsion thus formed may be the emulsion composition as described above. In one embodiment, the method includes allowing an unrefined petroleum acid within the unrefined petroleum material to enter into the emulsion (e.g. emulsion composition), thereby converting the unrefined petroleum acid into a surfactant. In other words, where the unrefined petroleum acid converts into a surfactant, the oil may be mobilized and therefore separated from the solid material. In some embodiments, the unrefined petroleum material is nonactive oil.

In another aspect, a method of converting an unrefined petroleum acid into a surfactant is provided. The method includes contacting an unrefined petroleum material with the aqueous composition, thereby forming an emulsion in contact with the unrefined petroleum material. An unrefined petroleum acid within the unrefined active petroleum material is allowed to enter the emulsion, thereby converting the unrefined petroleum acid into a surfactant. The aqueous composition includes water, a surfactant and a co-solvent as described herein. In some further embodiments, the aqueous composition includes a water-soluble polymer. In some further embodiments, the aqueous composition includes a gas. In some further embodiments, the aqueous composition includes a gas. In one embodiment, the co-solvent has the formula (I). In other embodiments, the co-solvent has the formula (II). In one embodiment, the co-solvent has the formula (III). Thus, in one embodiment, the aqueous composition is the aqueous composition described above. And in one embodiment, the emulsion is the emulsion composition described above. An unrefined petroleum acid within the unrefined petroleum material is allowed to enter the emulsion, thereby converting (e.g. mobilizing) the unrefined petroleum acid into a surfactant. In one embodiment, the unrefined active petroleum material is in a petroleum reservoir. In one embodiment, the unrefined petroleum material includes a nonactive oil.

IV. Examples

Phase Behavior Procedures

Phase Behavior Screening: Phase behavior studies have been used to characterize chemicals for EOR. There are many benefits in using phase behavior as a screening method. Phase Behavior studies are used to determine: (1) the effect of electrolytes; (2) oil solubilization and IFT reduction, (3) microemulsion densities; (4) microemulsion viscosities; (5) coalescence times; (6) optimal light co-solvent/alkali agent formulations; and/or (7) optimal properties for recovering oil from cores and reservoirs.

Thermodynamically stable phases can form with oil, water and non-surfactant aqueous mixtures. In situ generated soaps form micellar structures at concentrations at or above the critical micelle concentration (CMC). The emulsion coalesces into a separate phase at the oil-water interface and is referred to as a microemulsion. A microemulsion is a surfactant-rich distinct phase consisting of in situ generated soaps, oil and water and light co-solvent, alkali agent and other components. This phase is thermodynamically stable in the sense that it will return to the same phase volume at a given temperature. Some workers in the past have added additional requirements, but for the purposes of this engineering study, the only requirement will be that the microemulsion is a thermodynamically stable phase.

The phase transition is examined by keeping all variables fixed except for the scanning variable. The scan variable is changed over a series of pipettes and may include, but is not limited to, salinity, temperature, chemical (light co-solvent, alcohol, electrolyte), oil, which is sometimes characterized by its equivalent alkane carbon number (EACN), and light co-solvent structure, which is sometimes characterized by its hydrophilic-lipophilic balance (HLB). The phase transition was first characterized by Winsor (1954) into three regions: Type I—excess oil phase, Type III—aqueous, microemulsion and oil phases, and the Type II—excess aqueous phase. The phase transition boundaries and some common terminology are described as follows: Type I to III—lower critical salinity, Type III to II—upper critical salinity, oil solubilization ratio (Vo/Vs), water solubilization ratio (Vw/Vs), the solubilization value where the oil and water solubilization ratios are equal is called the Optimum Solubilization Ratio ($\sigma^*$), and the electrolyte concentration where the optimum solubilization ratio occurs is referred to as the Optimal Salinity (S*). Since no surfactant is added, the only surfactant present is the in-situ generated soap. For the purpose of calculating a solubilization ratio, one can assume a value for soap level using TAN(total acid number) and an approximate molecular weight for the soap.

Determining Interfacial Tension

Efficient use of time and lab resources can lead to valuable results when conducting phase behavior scans. A correlation between oil and water solubilization ratios and interfacial tension was suggested by Healy and Reed (1976) and a theoretical relationship was later derived by Chun Huh (1979). Lowest oil-water IFT occurs at optimum solubilization as shown by the Chun Huh theory. This is equated to an interfacial tension through the Chun Huh equation, where IFT varies with the inverse square of the solubilization ratio:

$$\gamma = \frac{C}{\sigma^2} \quad (1)$$

For most crude oils and microemulsions, C=0.3 is a good approximation. Therefore, a quick and convenient way to estimate IFT is to measure phase behavior and use the Chun-Huh equation to calculate IFT. The IFT between microemulsions and water and/or oil can be very difficult and time consuming to measure and is subject to larger errors, so using the phase behavior approach to screen hundreds of combinations of light co-solvents, electrolytes, oil, and so forth is not only simpler and faster, but avoids the measurement problems and errors associated with measuring IFT especially of combinations that show complex behavior (gels and so forth) and will be screened out anyway. Once a good formulation has been identified, then it is still a good idea to measure IFT.

Equipment

Phase behavior experiments are created with the following materials and equipment.

Mass Balance: Mass balances are used to measure chemicals for mixtures and determine initial saturation values of cores.

Water Deionizer: Deionized (DI) water is prepared for use with all the experimental solutions using a Nanopure™ filter system. This filter uses a recirculation pump and monitors the water resistivity to indicate when the ions have been removed. Water is passed through a 0.45 micron filter to eliminate undesired particles and microorganisms prior to use.

Borosilicate Pipettes: Standard 5 mL borosilicate pipettes with 0.1 mL markings are used to create phase behavior scans as well as run dilution experiments with aqueous solutions. Ends are sealed using a propane and oxygen flame.

Pipette Repeater: An Eppendorf Repeater Plus® instrument is used for most of the pipetting. This is a handheld dispenser calibrated to deliver between 25 microliter and 1 ml increments. Disposable tips are used to avoid contamination between stocks and allow for ease of operation and consistency.

Propane-oxygen Torch: A mixture of propane and oxygen gas is directed through a Bernz-O-Matic flame nozzle to create a hot flame about ½ inch long. This torch is used to flame-seal the glass pipettes used in phase behavior experiments.

Convection Ovens: Several convection ovens are used to incubate the phase behaviors and core flood experiments at the reservoir temperatures. The phase behavior pipettes are primarily kept in Blue M and Memmert ovens that are monitored with mercury thermometers and oven temperature gauges to ensure temperature fluctuations are kept at a minimal between recordings. A large custom built flow oven was used to house most of the core flood experiments and enabled fluid injection and collection to be done at reservoir temperature.

pH Meter: An ORION research model 701/digital ion analyzer with a pH electrode is used to measure the pH of most aqueous samples to obtain more accurate readings. This is calibrated with 4.0, 7.0 and 10.0 pH solutions. For rough measurements of pH, indicator papers are used with several drops of the sampled fluid.

Phase Behavior Calculations

The oil and water solubilization ratios are calculated from interface measurements taken from phase behavior pipettes. These interfaces are recorded over time as the mixtures approached equilibrium and the volume of any macroemulsions that initially formed decreased or disappeared.

Phase Behavior Methodology

The methods for creating, measuring and recording observations are described in this section. Scans are made using a variety of electrolyte mixtures described below. Oil is added to most aqueous non-surfactant solutions to see if a microemulsion formed, how long it took to form and equilibrate if it formed, what type of microemulsion formed and some of its properties such as viscosity. However, the behavior of aqueous mixtures without oil added is also important and is also done in some cases to determine if the aqueous solution is clear and stable over time, becomes cloudy or separated into more than one phase.

Preparation of samples. Phase behavior samples are made by first preparing non-surfactant aqueous stock solutions and combining them with brine stock solutions in order to observe the behavior of the mixtures over a range of salinities.

Solution Preparation. Non-surfactant aqueous stock solutions are based on active weight-percent co-solvent. The masses of light co-solvent, alkali agent and de-ionized water (DI) are measured out on a balance and mixed in glass jars using magnetic stir bars. The order of addition is recorded on a mixing sheet along with actual masses added and the pH of the final solution. Brine solutions are created at the necessary weight percent concentrations for making the scans.

Co-solvent Stock. The chemicals being tested are first mixed in a concentrated stock solution that usually consisted of light co-solvent, alkali agent and/or polymer along with de-ionized water. The quantity of chemical added is calculated based on activity and measured by weight percent of total solution. Initial experiments are at about 1-3% light co-solvent so that the volume of the middle microemulsion phase would be large enough for accurate measurements assuming a solubilization ratio of at least 10 at optimum salinity.

Polymer Stock. Often these stocks were quite viscous and made pipetting difficult so they are diluted with de-ionized water accordingly to improve ease of handling. Mixtures with polymer are made only for those light co-solvent formulations that showed good behavior and merited additional study for possible testing in core floods. Consequently, scans including polymer are limited since they are done only as a final evaluation of compatibility with the light co-solvent.

Pipetting Procedure. Phase behavior components are added volumetrically into 5 ml pipettes using an Eppendorf Repeater Plus or similar pipetting instrument. Light co-solvent, alkali agent and brine stocks are mixed with DI water into labeled pipettes and brought to temperature before agitation. Almost all of the phase behavior experiments are initially created with a water oil ratio (WOR) of 1:1, which involves mixing 2 ml of the aqueous phase with 2 ml of the evaluated crude oil or hydrocarbon, and different WOR experiments are mixed accordingly. The typical phase behavior scan consisted of 10-20 pipettes, each pipette being recognized as a data point in the series.

Order of Addition. Consideration must be given to the addition of the components since the concentrations are often several folds greater than the final concentration. Therefore, an order is established to prevent any adverse effects resulting from light co-solvent, alkali agent or polymer coming into direct contact with the concentrated electrolytes. The desired sample compositions are made by combining the stocks in the following order: (1) Electrolyte stock(s); (2) De-ionized water; (3) light co-solvent stock; (4) alkali agent stock; (5) Polymer stock; and (6) Crude oil or hydrocarbon.

Initial Observations. Once the components are added to the pipettes, sufficient time is allotted to allow all the fluid to drain down the sides. Then aqueous fluid levels are recorded before the addition of oil. These measurements are marked on record sheets. Levels and interfaces are recorded on these documents with comments over several days and additional sheets are printed as necessary.

Sealing and Mixing. The pipettes are blanketed with argon gas to prevent the ignition of any volatile gas present by the flame sealing procedure. The tubes are then sealed with the propane-oxygen torch to prevent loss of additional volatiles when placed in the oven. Pipettes are arranged on the racks to coincide with the change in the scan variable. Once the phase behavior scan is given sufficient time to reach reservoir temperature (15-30 minutes), the pipettes are inverted several times to provide adequate mixing. Tubes are observed for low tension upon mixing by looking at droplet size and how uniform the mixture appeared. Then the solutions are allowed to equilibrate over time and interface levels are recorded to determine equilibration time and light co-solvent/alkali agent performance.

Measurements and Observations. Phase behavior experiments are allowed to equilibrate in an oven that is set to the reservoir temperature for the crude oil being tested. The fluid levels in the pipettes are recorded periodically and the trend in the phase behavior observed over time. Equilibrium behavior is assumed when fluid levels ceased to change within the margin of error for reading the samples.

Fluid Interfaces. The fluid interfaces are the most crucial element of phase behavior experiments. From them, the phase volumes are determined and the solubilization ratios are calculated. The top and bottom interfaces are recorded as the scan transitioned from an oil-in-water microemulsion to a water-in-oil microemulsion. Initial readings are taken one day after initial agitation and sometimes within hours of agitation if coalescence appeared to happen rapidly. Measurements are taken thereafter at increasing time intervals (for example, one day, four days, one week, two weeks, one month and so on) until equilibrium is reached or the experiment is deemed unessential or uninteresting for continued observation.

V. Tables

TABLE 1

Effect of many variables on emulsion viscosity and stability

| | | | Viscosity | Stability |
|---|---|---|---|---|
| Heavy Crude Oil | Oil %[1] | | ↑ | ↑ | ↑ |
| | Viscosity[2] | | ↑ | minor effect | ? |
| Aqueous | Composition[3] Salinity[4] | | ↑ | ↑ | ? |
| | Alkali Conc.[5a] | NaOH | ↑ | ↑ | ↑ |
| | | Na2CO3[5b] | ↑ | ↑ | ↑ |
| Co-solvent | Type[6] | | | | |
| | Concentration[7] | | ↑ | ↓ | ? |
| | # of EO's[8] | | ↑ | Minor effect | ? |
| Shear rate in pipeline[9] | | | ↑ | ↓ | ? |
| Environmental | Temp of Transport[10] | | ↑ | ↓ | ↓ |
| | Time of storage[11] | | ↑ | ↓ | |
| Emulsion Prep Procedure | Temp of mixing[12] | | ↑ | ↓ | ↑ |
| | Mixing time[12] | | ↑ | ↑ | ↑ |
| | Mixing speed[12] | | ↑ | ↑ | ↑ |

VI. Embodiments

Embodiment 1

An aqueous composition comprising water, a surfactant and a co-solvent having the formula:

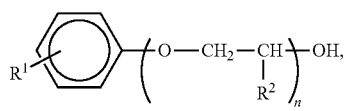

wherein $R^1$ is independently hydrogen or unsubstituted $C_1$-$C_6$ alkyl; $R^2$ is independently hydrogen or unsubstituted $C_1$-$C_2$ alkyl; and n is an integer from 1 to 30.

Embodiment 2

The aqueous composition of embodiment 1, wherein $R^1$ is unsubstituted $C_2$-$C_6$ alkyl.

Embodiment 3

The aqueous composition of any one of embodiments 1 or 2, wherein $R^1$ is unsubstituted $C_4$-$C_6$ alkyl.

Embodiment 4

The aqueous composition of any of the preceding embodiments, wherein $R^1$ is unsubstituted $C_2$ alkyl.

Embodiment 5

The aqueous composition of any of the preceding embodiments, wherein $R^1$ is methyl.

Embodiment 6

The aqueous composition of any of the preceding embodiments, wherein $R^1$ is hydrogen.

Embodiment 7

The aqueous composition of any of the preceding embodiments, wherein $R^2$ is hydrogen.

Embodiment 8

The aqueous composition of any of the preceding embodiments, wherein $R^2$ is methyl.

Embodiment 9

The aqueous composition of any of the preceding embodiments, wherein $R^2$ is ethyl.

Embodiment 10

The aqueous composition of any of the preceding embodiments, wherein n is an integer from 1 to 10.

Embodiment 11

The aqueous composition of any of the preceding embodiments, wherein $R^1$ is hydrogen and n is 6.

Embodiment 12

The aqueous composition of any of the preceding embodiments, wherein $R^1$ is hydrogen and n is 6.

Embodiment 13

The aqueous composition of any of the preceding embodiments, wherein said co-solvent has the formula:

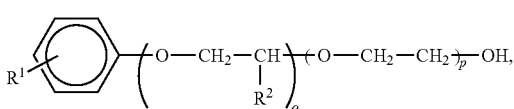

wherein $R^2$ is methyl or ethyl; o is an integer from 0 to 15; and p is an integer from 1 to 10.

Embodiment 14

The aqueous composition of any of the preceding embodiments, wherein $R^1$ is hydrogen, o is O and p is 6.

Embodiment 15

The aqueous composition of any of the preceding embodiments, wherein said co-solvent has the formula:

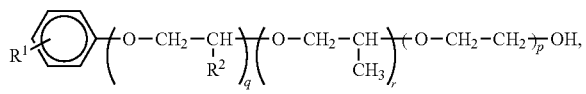

wherein $R^1$ is ethyl; q is an integer from 0 to 10; r is an integer from 0 to 10; and p is an integer from 1 to 10.

Embodiment 16

The aqueous composition of any of the preceding embodiments, comprising a plurality of different surfactants.

Embodiment 17

The aqueous composition of embodiment 16, wherein said plurality of different surfactants comprises an anionic surfactant, a non-ionic surfactant, a zwitterionic surfactant or a cationic surfactant.

Embodiment 18

The aqueous composition of embodiment 17, wherein said anionic surfactant is an alkoxy carboxylate surfactant, an alkoxy sulfate surfactant, an alkoxy sulfonate surfactant, an alkyl sulfonate surfactant, an aryl sulfonate surfactant or an olefin sulfonate surfactant.

Embodiment 19

The aqueous composition of any of the preceding embodiments, wherein said co-solvent is present in an amount sufficient to increase the solubility of said surfactant in said aqueous composition relative to the absence of said co-solvent.

Embodiment 20

The aqueous composition of any of the preceding embodiments, further comprising a viscosity enhancing water soluble polymer.

Embodiment 21

The aqueous composition of embodiment 20, wherein said viscosity enhancing water soluble polymer is polyacrylamide or a co-polymer of polyacrylamide.

Embodiment 22

The aqueous composition of any of the preceding embodiments, further comprising a gas.

Embodiment 23

The aqueous composition of any of the preceding embodiments, further comprising an alkali agent.

Embodiment 24

The aqueous composition of embodiment 23, wherein said alkali agent is NaOH, KOH, LiOH, $Na_2CO_3$, $NaHCO_3$, Na-metaborate, Na silicate, Na orthosilicate or $NH_4OH$.

Embodiment 25

The aqueous composition of any of the preceding embodiments, comprising more than 10 ppm of $Ca^{2+}$ and $Mg^{2+}$ combined.

Embodiment 26

The aqueous composition of any of the preceding embodiments, comprising more than 100 ppm of $Ca^{2+}$ and $Mg^{2+}$ combined.

Embodiment 27

The aqueous composition of any of the preceding embodiments, comprising more than 1000 ppm of $Ca^{2+}$ and $Mg^{2+}$ combined.

Embodiment 28

The aqueous composition of any of the preceding embodiments, having a pH of less than 9.5.

Embodiment 29

The aqueous composition of any of the preceding embodiments, having a salinity of at least 5,000 ppm.

Embodiment 30

The aqueous composition of any of the preceding embodiments, having a salinity of at least 50,000 ppm.

Embodiment 31

The aqueous composition of any of the preceding embodiments, having a salinity of at least 150,000 ppm.

Embodiment 32

An emulsion composition comprising an unrefined petroleum phase and an aqueous phase, wherein said aqueous phase comprises water, a surfactant and a co-solvent having the formula:

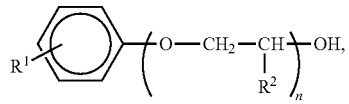

wherein $R^1$ is independently hydrogen or unsubstituted $C_1$-$C_6$ alkyl; $R^2$ is independently hydrogen or unsubstituted $C_1$-$C_2$ alkyl; and n is an integer from 1 to 30.

Embodiment 33

The emulsion composition of embodiment 32, wherein said co-solvent has the formula:

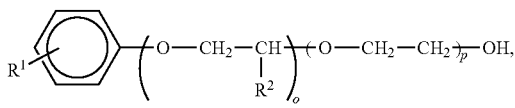

wherein $R^2$ is methyl or ethyl; o is an integer from 0 to 15; and p is an integer from 1 to 10.

Embodiment 34

The emulsion composition of embodiments 15 or 33, wherein said emulsion composition is a microemulsion.

Embodiment 35

The emulsion composition of any one of embodiments 32-34, wherein said co-solvent is present in an amount sufficient to increase the solubility of said surfactant in said aqueous phase relative to the absence of said co-solvent.

Embodiment 36

The emulsion composition of any one of embodiments 32-35, comprising a plurality of different surfactants.

Embodiment 37

The emulsion composition of embodiment 36, wherein said plurality of different surfactants comprises an anionic surfactant, a non-ionic surfactant, a zwitterionic surfactant or a cationic surfactant.

Embodiment 38

The emulsion composition of any one of embodiments 32-37, further comprising a viscosity enhancing water soluble polymer.

Embodiment 39

The emulsion composition of any one of embodiments 32-38, further comprising a gas.

Embodiment 40

The emulsion composition of any one of embodiments 32-39, further comprising an alkali agent.

Embodiment 41

The emulsion composition of any one of embodiments 32-40, having a pH of less than 9.5.

Embodiment 42

The emulsion composition of any one of embodiments 32-41, wherein said unrefined petroleum phase comprises a nonactive oil.

Embodiment 43

A method of displacing an unrefined petroleum material in contact with a solid material, said method comprising: (i) contacting an unrefined petroleum material with the aqueous composition of one of embodiments 1 to 31, wherein said unrefined petroleum material is in contact with a solid material; (ii) allowing said unrefined petroleum material to separate from said solid material thereby displacing said unrefined petroleum material in contact with said solid material.

Embodiment 44

The method of embodiment 43, further comprising contacting said solid material with said aqueous composition.

Embodiment 45

The method of any one of embodiments 43-44, wherein said co-solvent is present in an amount sufficient to increase the solubility of said surfactant relative to the absence of said co-solvent.

Embodiment 46

The method of any one of embodiments 43-45, wherein said method is an enhanced oil recovery method.

Embodiment 47

The method of any one of embodiments 43-46, wherein said natural solid material is rock or regolith.

Embodiment 48

The method of any one of embodiments 47, wherein said regolith is soil.

Embodiment 49

The method of any one of embodiments 43-48, wherein an emulsion forms after said contacting.

Embodiment 50

The method of any one of embodiments 43-49, wherein said unrefined petroleum material is a nonactive oil.

Embodiment 51

A method of converting an unrefined petroleum acid into a surfactant, said method comprising: (i) contacting a petroleum material with the aqueous composition of one of embodiments 1 to 31, thereby forming an emulsion in contact with said petroleum material;
(ii) allowing an unrefined petroleum acid within said unrefined petroleum material to enter into said emulsion, thereby converting said unrefined petroleum acid into a surfactant.

Embodiment 52

The method of embodiment 51, wherein said unrefined petroleum material is in a petroleum reservoir.

Embodiment 53

The method of embodiment 51, wherein said unrefined petroleum material comprises a nonactive oil.

What is claimed is:
1. A method of converting an unrefined petroleum acid into a surfactant, the method comprising:
(i) contacting a petroleum material with an aqueous composition comprising water, an anionic surfactant, an alkali agent, and a co-solvent having the formula

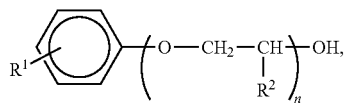

wherein
- $R^1$ is independently hydrogen or unsubstituted $C_1$-$C_4$ alkyl;
- $R^2$ is independently hydrogen or unsubstituted $C_1$-$C_2$ alkyl; and
- n is an integer from 1 to 30, thereby forming an emulsion in contact with the petroleum material;
- wherein the co-solvent is present in an amount of from 0.25% to 3% by weight, based on the weight of the aqueous composition, wherein the aqueous composition has a salinity of at least 5,000 ppm and a pH of from 9.5 to 12, and wherein the anionic surfactant consists essentially of one or more anionic surfactants that are not alcohol phosphate surfactants or phosphate alkyl ester surfactants, and
- (ii) allowing the unrefined petroleum acid within an unrefined petroleum material to enter into the emulsion, thereby converting the unrefined petroleum acid into the surfactant.

2. The method of claim 1, wherein the emulsion is a microemulsion.

3. The method of claim 1, wherein the unrefined petroleum material is in a petroleum reservoir.

4. The method of claim 3, wherein the unrefined petroleum material is in contact with a solid material.

5. The method of claim 4, further comprising allowing the unrefined petroleum material to separate from the solid material thereby displacing the unrefined petroleum material in contact with the solid material.

6. The method of claim 5, further comprising recovering the unrefined petroleum material from the petroleum reservoir.

7. The method of claim 6, wherein the method is an enhanced oil recovery method.

8. The method of claim 1, wherein $R^1$ is unsubstituted $C_1$-$C_4$ alkyl.

9. The method of claim 1, wherein $R^1$ is hydrogen.

10. The method of claim 1, wherein $R^2$ is hydrogen.

11. The method of claim 1, wherein n is an integer from 1 to 10.

12. The method of claim 1, wherein $R^1$ is hydrogen and n is 6.

13. The method of claim 1, wherein the co-solvent has the formula:

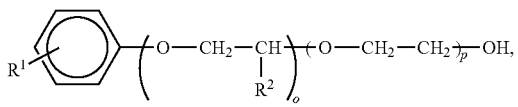

wherein
- $R^1$ is independently hydrogen or unsubstituted $C_1$-$C_4$ alkyl;
- $R^2$ is methyl or ethyl;
- o is an integer from 0 to 15; and
- p is an integer from 1 to 10.

14. The method of claim 13, wherein $R^1$ is hydrogen, o is 0 and p is 6.

15. The method of claim 1, wherein-the alkali agent is NaOH, KOH, LiOH, $Na_2CO_3$, $NaHCO_3$, Na-metaborate, Na silicate, Na orthosilicate or $NH_4OH$.

16. The method of claim 1, wherein the anionic surfactant includes an alkoxy sulfate surfactant.

17. The method of claim 1, wherein the water is hard brine.

18. The method of claim 1, wherein the aqueous composition has a salinity of at least 50,000 ppm.

19. The method of claim 1, wherein the aqueous composition has a pH of from 9.5 to 12.

20. The method of claim 1, wherein the anionic surfactant includes an alkoxy carboxylate surfactant, an olefin sulfonate surfactant, an alkyl benzene sulfonate surfactant, an alkyl sulfonate surfactant, an aryl sulfonate surfactant, and combinations thereof.

21. The method of claim 1, wherein the anionic surfactant does not include an alcohol phosphate surfactant or phosphate alkyl ester surfactants.

* * * * *